(12) United States Patent
Tokanai et al.

(10) Patent No.: US 8,134,129 B2
(45) Date of Patent: Mar. 13, 2012

(54) MICROCHANNEL PLATE, GAS PROPORTIONAL COUNTER AND IMAGING DEVICE

(75) Inventors: Fuyuki Tokanai, Yamagata (JP);
 Takahisa Sakurai, Yamagata (JP);
 Shuichi Gunji, Yamagata (JP);
 Takayuki Sumiyoshi, Ibaraki (JP);
 Teruyuki Okada, Shizuoka (JP);
 Tetsuro Endo, Shizuoka (JP); Yoshio Fujita, Shizuoka (JP)

(73) Assignee: Japan Science and Technology Agency, Saitama (JP)

( * ) Notice: Subject to any disclaimer, the term of this patent is extended or adjusted under 35 U.S.C. 154(b) by 490 days.

(21) Appl. No.: 11/989,537

(22) PCT Filed: Jul. 28, 2006

(86) PCT No.: PCT/JP2006/315062
 § 371 (c)(1),
 (2), (4) Date: Aug. 19, 2009

(87) PCT Pub. No.: WO2007/013630
 PCT Pub. Date: Feb. 1, 2007

(65) Prior Publication Data
 US 2011/0155919 A1 Jun. 30, 2011

(30) Foreign Application Priority Data

Jul. 29, 2005 (JP) ................................. 2005-221722

(51) Int. Cl.
 *G01T 1/00* (2006.01)
(52) U.S. Cl. .................................... 250/361 R; 250/362

(58) Field of Classification Search .............. 250/361 R, 250/362, 367, 368, 370.01, 370.09, 389
See application file for complete search history.

(56) References Cited

U.S. PATENT DOCUMENTS 4,825,118 A    4/1989   Kyushima ...................... 313/104
6,333,506 B1  12/2001  Francke et al.

FOREIGN PATENT DOCUMENTS

| CN | 1349613 A    | 5/2002  |
|----|--------------|---------|
| JP | S62-058536 A | 3/1987  |
| JP | 05-074406    | 3/1993  |
| JP | 09-063533 A  | 3/1997  |
| JP | 2002-543573  | 12/2002 |
| JP | 2004-241298  | 8/2004  |
| JP | 2005-032634  | 2/2005  |

(Continued)

OTHER PUBLICATIONS

H. Sakurai, et al. "A new type of proportional counter using a capillary plate", Nuclear Instruments and Methods in Physics Research A 374 (1996) 341-344.

(Continued)

*Primary Examiner* — Mark R Gaworecki
(74) *Attorney, Agent, or Firm* — Morgan, Lewis & Bockius LLP

(57) ABSTRACT

An object of the present invention is to provide a microchannel plate having excellent characteristics which enable to attain both high luminance and high resolution at the same time, a gas proportional counter using such a microchannel plate and an imaging device. The microchannel plate according to the present invention comprises a base body provided with a plurality of through holes (13) and having an insulating property, and is arranged in a gas atmosphere mainly containing an inert gas to constitute a proportional counter. The base body has photoelectric converter portions (1a, 1b) formed on at least inner walls of the plurality of through holes (13).

8 Claims, 21 Drawing Sheets

FOREIGN PATENT DOCUMENTS

| | | |
|---|---|---|
| WO | WO 00/67043 | 11/2000 |
| WO | WO 2004 049382 A2 | 6/2004 |

OTHER PUBLICATIONS

H. Sakurai, et al. "Detection of Photoabsorption Point With Capillary Imaging Gas Proportional Counter", IEEE Transactions on Nuclear Science, vol. 49, No. 3, Jun. 2002.

M. Tsukahara, et al. "The Development of a New Type of Imaging X-Ray Detector with a Capillary Plate", IEEE Transactions on Nuclear Science vol. 44, No. 3, Jun. 1997.

H. Sakurai, et al. "The Form of X-ray Photoelectron Tracks in a Capillary Gas Proportional Counter" IEEE Transactions on Nuclear Science, vol. 46, No. 3, Jun. 1999.

H. Sakurai "Imaging Gas Proportional Counter with Capillary Plate" vol. 25, No. 1 (1999).

T. Masuda, et al. "Optical Imaging Capillary Gas Proportional Counter With Penning Mixtures" IEEE Transactions on Nuclear Science, vol. 49, No. 2, Apr. 2002.

F. Sauli "GEM: A new concept for electreon amplification in gas detectors" Nuclear Instruments and Methods in Physics Research A 386 (1997) 531-534.

F.A.F. Fraga, et al. "Quality control of GEM detectors using scintillation techniques" Nuclear Instruments and Methods in Physics Research A 442 (2000) 417-422.

D. Mormann, et al. "GEM-based gaseous photomultipliers for UV and visible photon imaging" Nuclear Instruments and Methods in Physics Research Z 504 (2003) 93-98.

H. Sakurai, et al. "Characteristics of capillary gas proportional counter", SPIE vol. 2806, pp. 569-576 (Publication Date: 1996).

H. Sakurai, et al. "New Type of Imaging X-Ray Detector Using A Capillary Plate" SPIE vol. 3114, pp. 481-487 (Publication Date: 1997).

Yuji Nishi, et al. "Development of a hybrid MSGC with a conductive capillary plate" SPIE, vol. 3774, pp. 87-96 (Publication Date: 1999).

MICROCHANNEL PLATE, GAS PROPORTIONAL COUNTER AND IMAGING DEVICE

TECHNICAL FIELD

The present invention relates to a microchannel plate, a gas proportional counter, and an imaging device.

BACKGROUND ART

In recent years, a new type of radiation detector has been developed in which a capillary plate made of lead glass and functioning as a microchannel plate (MCP) is operated as an imaging type capillary gas proportional counter (CGPC) (see Non-Patent Documents 1 to 8). Recently, a gas electron multiplier (GEM) has received attention as another radiation detector capable of detecting a two-dimensional position of an X-ray or the like (see Non-Patent Documents 10 to 12).

Furthermore, the present inventor has further improved a conventional CGPC, and has suggested a capillary plate capable of sufficiently reducing a noise level and a new CGPC using the plate (Patent Document 1), and a CGCP which is excellent in shock resistance and handling property as compared with the GEM and in which uniformity of a sensitivity distribution is further improved (Patent Document 2).

Non-Patent Document 1: H. Sakurai et al., "A new type of proportional counter using a capillary plate", Nucl. Instr. and Meth. In Phys. Res. A374 (1996) 341 to 344.

Non-Patent Document 2: H. Sakurai et al., "Characteristics of capillary gas proportional counter", SPIE Proceedings Reprint, vol. 2806 (1996) 569 to 576.

Non-Patent Document 3: H. Sakurai et al., "Detection of photoabsorption point with capillary imaging gas proportional counter", IEEE Trans. on Nucl. Sci. vol. 49, No. 3, (2002).

Non-Patent Document 4: M. Tsukahara et al., "The development of a new type of imaging X-ray detector with a capillary plate", IEEE Trans. on Nucl. Sci. vol. 49, No. 3, (1997) 679 to 682.

Non-Patent Document 5: H. Sakurai et al., "The form of X-ray photoelectron tracks in a capillary gas proportional counter", IEEE Trans. on Nucl. Sci. vol. 46, No. 3, (1999) 333 to 337.

Non-Patent Document 6: H. Sakurai, "Imaging gas proportional counter with capillary plate", Radiation vol. 25, No. 1, (1999) 27 to 37.

Non-Patent Document 7: H. Sakurai et al., "New type of imaging X-ray detector using a capillary plate", SPIE Proceedings Reprint, vol. 3114 (1997) 481 to 487.

Non-Patent Document 8: T. Masuda et al., "Optical imaging capillary gas proportional counter with penning mixtures", IEEE Trans. on Nucl. Sci. vol. 49, No. 2, (2002) 553 to 558.

Non-Patent Document 9: Nishi, Yu.; Tanimori, Y.; Ochi, A.; Nishi, Ya.; Toyokawa, H., "Development of a hybrid MSGC with a conductive capillary plate.", SPIE, vol. 3774 (1999) 87-96.

Non-Patent Document 10: F. Sauli, Nucl. Instr. and Meth. A 368 (1977) 531.

Non-Patent Document 11: F. A. F. Fraga, et al., Nucl. Instr. and Meth. A 442 (2000) 417.

Non-Patent Document 12: D. Mormann, et al., Nucl. Instr. and Meth. A 504 (2003) 93.

Patent Document 1: Japanese Patent Application Laid-Open No. 2004-241298

Patent Document 2: Japanese Patent Application Laid-Open No. 2005-32634

DISCLOSURE OF THE INVENTION

Problem to be Solved by the Invention

Here, a schematic constitution of an imaging device using a CGCP will be described in accordance with an imaging type X-ray detection device. The imaging type X-ray detection device usually has a constitution in which an optical system and an imaging system are arranged in order after the CGCP. The CGCP is installed in a chamber having one end thereof provided with a beryllium window which an electromagnetic wave such as an X-ray enters and having the other end thereof provided with a light transmission window. A CP is a thin plate-like member in which a plurality of lead glass capillaries constituting a hollow-like shape and having a diameter of about 100 μm are integrated, and thin film electrodes are formed on opposite surfaces of the CP. Furthermore, a shaping ring connected to a power source and an installation potential is provided before the CP (a photoelectric surface side), to define a drift area. The chamber is filled with a mixture gas comprising such as an Ar gas and a $CH_4$ gas as main components, in which trimethyl amine (TMA) or the like is added to produce a penning effect.

When the X-ray enters the imaging type X-ray device having such a constitution through the beryllium window, gas molecules and the X-ray interact with each other between the beryllium window and one surface ($CP_{IN}$) of the CP facing the window, to produce and emit primary electrons (X-ray photoelectrons) having high energy owing to a photoelectric effect. The primary electrons advance while imparting the energy to another gas, and generates electron-ion pairs in a track of the electrons to form electron cloud, and the electron cloud enters the capillaries from the one surface ($CP_{IN}$) of the CP. In the capillaries, an electric field of, for example, $10^4$ V/cm or more is formed, and the electrons successively collide with the gas molecules to cause electric discharge of the gas and excitation emission, thereby performing electron multiplication (e.g., $10^3$ to $10^4$ times) and light multiplication. Amplified light passes through the light transmission window to enter the optical system, and is guided into the imaging system.

When such an imaging type X-ray detection device is used, the present inventor appropriately selects and operates two different types of modes including a so-called high luminance mode and a high resolution mode in accordance with an application by use of characteristics of the CGCP.

That is, the high luminance mode is a usual operation mode to apply a forward bias voltage in a direction in which the electron cloud moves (drifts) so as to be attracted toward the CP. In this case, the whole electron cloud generated by the primary electrons can enter the CP, and hence a remarkably high luminance (sensitivity, X-ray detection efficiency) is achieved. However, a probability at which the electron cloud is diffused while drifting in the gas volume. Therefore, incident positional information of the X-ray is easily lost, and a resolution characteristic (positional resolution) tends to slightly deteriorate.

On the other hand, contrary to the high luminance mode, in a drift area, the high resolution mode is an operation mode to apply a reverse bias voltage in a direction in which the electron cloud moves (drifts) so as to be expelled toward the beryllium window. According to the finding of the present inventor, a reason why the high resolution can be achieved by the application of such a reverse bias voltage is presumed as follows.

That is, the primary electrons generated in the drift area and having a long track and the electron cloud generated during advancing of the electrons are inhibited from entering the CP owing to the reverse bias voltage. Therefore, the electron cloud generated in the vicinity of $CP_{IN}$ enters the capillaries of the CP to participate in the electron/light multiplication. Then, the electron cloud generated in the vicinity of $CP_{IN}$ has a short distance to the CP, is therefore hardly diffused in a gas, and can enter the capillary close to a position where the cloud has been generated. Thus, the only electron cloud that is hardly diffused and that retains incident positional information of the X-ray substantially contributes to the electron/light multiplication in the capillary, and hence the positional resolution can be determined by a capillary diameter itself.

However, the high resolution mode to apply the reverse bias voltage in this manner has an excellent resolution characteristic, but a large amount of electrons (the electron cloud) generated in the drift area do not enter the capillaries. Therefore, the number of the electrons which contribute to the electron/light multiplication in the capillaries is reduced, and the luminance (sensitivity, X-ray detection efficiency) tends to lower.

To solve the problem, the present invention has been developed in view of such a situation, and an object thereof is to provide an MCP having excellent characteristics which enable to attain both high luminance and high resolution at the same time, a gas proportional counter, and an imaging device.

Means for Solving the Problem

To solve the above problem, an MCP according to the present invention comprises a base body provided with a plurality of through holes and having an insulating property, and is arranged in a gas atmosphere mainly containing an inert gas so as to constitute a proportional counter, and the base body has photoelectric converter portions formed on at least inner walls of the plurality of through holes. Here, the photoelectric converter portions may be provided on, for example, the surface of the base body around opening ends of the through holes, as long as the photoelectric converter portions are formed on the inner walls of the through holes (i.e., inner surfaces of the through holes).

In the MCP having such a constitution, a plurality of through holes function as microchannels to perform electron/light multiplication in a state in which a voltage is applied to opposite end surfaces of the base body to form an electric field. The present inventor manufactured for trial the MCP having such a constitution, and operated the MCP in the above-mentioned 'high resolution mode' to apply the reverse bias voltage, instead of the CP of the imaging type X-ray detection device disclosed in, for example, Patent Document 1, whereby it has been confirmed that luminance comparable to that of the above-mentioned 'high-luminance mode' is achieved while a sufficient resolution characteristic is obtained.

Moreover, a constitution of this MCP was modeled, and Monte Carlo simulation of an interaction of the X-ray, the gas and a material substance of the CP was performed by use of EGS4 code (the EGS4 Code System by W. R. Nelson, H. Hirayama and D. W. O. Rogers, SLAC-265, Stanford Linear Accelerator Center, 1985), to evaluate detection efficiency and pulse wave height spectrum (distribution).

As a result, it has been confirmed that in a case where the MCP having the photoelectric converter portions formed on at least the inner walls of the plurality of through holes (the inner surfaces of the through holes is used, as compared with an MCP which does not have such photoelectric converter portions, detection efficiency especially with respect to the X-ray having energy of 10 keV or more is significantly improved.

Furthermore, the present inventor modeled a three-dimensional constitution of the MCP, and performed simulation of electric field and electron behaviors by use of codes of Maxwell 3-D field simulator (commercial finite element computation package, Ansoft Co. Pittsburgh, Pa., USA.) and Garfield (R. Veenhof, Nucl. Instr. and Meth. A419 (1998) 726. HYPERLINK "http://garfield.web.cern.ch/garfield/" http://garfield.web.cern.ch/Garfield/). It is to be noted that the electric field was calculated by Maxwell, and movement of electrons in a gas was calculated by Garfield. As a result, it has been turned out that the electron cloud generated in the drift area before the through holes tends to have difficulty in entering the through holes having the photoelectric converter portions provided on at least the inner walls the through holes (the inner surfaces of the through holes).

Therefore, it is presumed that in the MCP having the photoelectric converter portions formed on at least the inner walls of the plurality of through holes (the inner surfaces of the through holes), the electron cloud generated outside the MCP is sufficiently inhibited from entering the through holes, whereas primary electrons highly efficiently generated in the photoelectric converter portions substantially contribute to the electron/light multiplication in the through holes. The mechanism of the function is not limited to this example.

Moreover, a material of the photoelectric converter portions interacts with an electromagnetic wave, a particle beam or the like of a measurement target. As a result, there is not any special restriction on the material as long as the material includes a substance for generating the electromagnetic wave, the particle beam or the like. In addition to a transition metal, a heavy metal and a noble metal, examples of the material include a material including alkali metal electrons and a material having a large sectional area which reacts with the measurement target. More specifically, when the measurement target is visible light (a wavelength of about 400 nm to 800 nm), multialkali including a plurality of types of alkali metals described later is preferable, and bialkali is more preferable with respect to visible light especially having a wavelength of about 300 nm to 600 nm. Examples of a preferable metal may include CsI with respect to vacuum ultraviolet light having a wavelength shorter than about 200 nm, and Au and Cs with respect to an X-ray to a γ-ray having a short wavelength. Furthermore, when the measurement target is neutron radiation, a material including B, Gd or the like is preferable. Thus, when the measurement target is the electromagnetic wave, a material including alkali metal electrons is especially useful as the material of the photoelectric converter portions.

The present inventor manufactured for trial an MCP provided with the photoelectric converter portions including alkali metal atoms, and operated the MCP in the above-mentioned 'high resolution mode' to apply the reverse bias voltage, instead of the CP of the imaging type X-ray detection device disclosed in, for example, Patent Document 1. Even in this case, it has been confirmed that the luminance comparable to that of the above-mentioned 'high-luminance mode' is achieved while the sufficient resolution characteristic is obtained. Moreover, the contribution of photoelectrons generated by the interaction between the alkali metal and the X-ray has been clarified from the evaluation of the pulse wave height spectrum. From these results, it is strongly suggested that the photoelectrons generated by the interaction between the metal atoms of the alkali metal or the like included in the photoelectric converter portions and the X-ray function as an electron source (i.e., the primary electrons) for the electron/light multiplication in the through holes. Furthermore, in the electric field simulation by Maxwell & Garfield, it has been confirmed that even in a case where the photoelectric converter portions including the alkali metal atoms are provided in a peripheral direction of the inner walls of the ends of the through holes, the electron cloud generated outside the MCP does not easily enter the through holes.

Moreover, in the electric field simulation by Maxwell & Garfield, it has been confirmed that in a case where a height (a height along an axial direction of the through holes; i.e., a depth of the photoelectric converter portions in the photoelectric converter portions) of the photoelectric converter portions disposed on the inner walls of the through holes (in the peripheral direction of the end inner walls) is variously changed, when the length exceeds a certain degree, the electron cloud generated outside the MCP does mostly not participate in the electron/light multiplication in the through holes.

That is, it is more preferable that the photoelectric converter portions satisfy a relation represented by the following formula (1):

$$Lcp \times 0.1 < La \qquad (1),$$

in which Lcp is the length of each through hole in the axial direction, and La is the length of each photoelectric converter portion along the axial direction of the through hole.

Moreover, it is further useful that the photoelectric converter portions also serve as electrodes for applying a predetermined voltage to opposite ends of the through holes. In this case, high sensitivity can easily be achieved in a broad wavelength range of a wavelength region of the ultraviolet light to that of near-infrared light. The number of the electrons generated at end of through-ports can be increased with respect to a shorter-wavelength electromagnetic wave such as the X-ray. Therefore, the high sensitivity can easily be realized with respect to the broad wavelength region.

Specifically, it is more preferable that the photoelectric converter portions include a plurality of types of alkali metal atoms. In this case, photoelectric conversion efficiency is further improved, and the number of the electrons generated at the ends of the through-ports can further be increased with respect to, for example, the X-ray.

More specifically, sections of the inner walls of the plurality of through holes have a substantially linear shape.

Moreover, a gas proportional counter according to the present invention comprise a chamber filled with a gas for detection mainly including an inert gas and having a window which an electromagnetic wave or ionization radiation enters, and the MCP arranged in the chamber according to the present invention. It is to be noted that the "proportional counter" is not limited to a tubular member, and is the whole counting device which functions as a proportional counting region.

Furthermore, it is preferable that the gas for detection contains an organic gas including a halogen atom in molecules.

In a case where a mixture gas is used in which an amine gas such as TMA or TEA is added to a gas including an Ar gas, a $CH_4$ gas and the like as main components, a wavelength of excited and emitted light of Ar having a wavelength of 127 nm is converted by TMA to emit light having a wavelength of 290 nm. Therefore, in a usual imaging device, conversion into visible light is necessary. On the other hand, when the gas for detection contains an organic gas including the halogen atom in the molecules (e.g., a hydrocarbon gas in which at least one hydrogen atom, for example, alkane halide such as $CF_4$ is replaced with a fluorine atom), visible light having a wavelength longer than a conventional wavelength (when $CF_4$ is included, an emission region is about 400 to 900 nm, and a peak wavelength is about 620 nm) can highly efficiently be emitted.

Moreover, an imaging device according to the present invention includes the proportional counter according to the present invention, and a photo-detector arranged after the chamber. It is to be noted that in consideration of particulars so far, in other words, it may be said that the MCP according to the present invention comprises a base body provided with a plurality of through holes and having an insulating property, and is arranged in a gas atmosphere mainly containing an inert gas to constitute a proportional counter, and the base body has photoelectric converter portions provided around opening ends of the through holes and including alkali metal atoms. It is preferable that the photoelectric converter portions are provided on inner walls of the plurality of through holes.

Effect of the Invention

According to an MCP, a gas proportional counter and an imaging device of the present invention, photoelectric converter portions provided around opening ends of through holes formed in the MCP and including alkali metal atoms inhibit electron cloud generated outside the MCP from entering the through holes. On the other hand, primary electrons highly efficiently generated in the photoelectric converter portions substantially contribute to electron/light multiplication in the through holes, and it is therefore possible to realize an excellent characteristic that both high luminance and high resolution can be attained at the same time.

BEST MODE FOR CARRYING OUT THE INVENTION

An embodiment of the present invention will hereinafter be described in detail. It is to be noted that the same elements are denoted with the same reference numerals, and redundant description is omitted. It is assumed that vertical and horizontal positional relations are based on a positional relation shown in the drawings, unless otherwise specified. Furthermore, a dimensional ratio of the drawing is not limited to a shown ratio.

FIG. 1 is a plan view schematically showing one preferable embodiment of an MCP according to the present invention, and FIG. 2 is a sectional view cut along the II-II line of FIG. 1. In an MCP 1, an outer peripheral frame 12 is bonded to a periphery of an insulating porous plate 11 (a base body) having a plate-like shape. A plurality of channels 13 (through holes) are provided along a thickness direction of the porous plate 11, and there is not any special restriction on a material of the plate. Examples of the material include channel glass (may or may not include lead) constituted of a capillary plate bonded to a glass frame disclosed in Patent Document 1 or the like, and a plurality of hollow fiber tubes made of a resin and arranged in a resin frame disclosed in Patent Document 2.

These channels 13 provided in the porous plate 11 constitute independent electron/light multipliers, respectively. Furthermore, opposite surfaces of the porous plate 11 are provided with electrodes 1a, 1b (photoelectric converter portions) each including a thin film constituted of a transition metal alloy (e.g., inconel or the like) formed by a vacuum evaporation or the like, a metal including an alkali metal atom or the like.

Examples of a metal material including the alkali metal atom for use in the electrodes 1a, 1b include a bialkali compound, a multialkali compound, a compound of bialkali and antimony or tellurium, and a compound of multialkali and antimony or tellurium. The electrodes 1a, 1b may further include another layer constituted of a carbon nano-tube or the like. Furthermore, for example, a neutron radiation absorbing sectional area (a sectional area which reacts with neutrons) may include large nuclear species.

Here, FIG. 3 is a main part enlarged view of FIG. 2, and a sectional view schematically showing the channels 13 and peripheries of the channels. The channels 13 have an elongated linear hole-like shape. That is, an inner wall is linearly formed so that an inner diameter thereof is substantially constant along an extension axis G. It is to be noted that in the drawing, the channel 13 has a bias angle (an angle formed by a direction vertical to the surface of the porous plate 11 and the extension axis G) of approximately 0°, but the bias angle may be, for example, about 5 to 15°.

Moreover, the electrodes 1a, 1b are provided so as to cover a periphery of an opening end of the channel 13, and are extended onto the inner walls at the ends of the channels 13 so as to enter the channels 13 from opening ends of the channels.

Furthermore, the one electrode 1a (an electrode provided on a side $CP_{IN}$ which an electromagnetic wave such as the X-ray enters at a time when the MCP 1 is provided in the imaging device as described later) is provided so as to satisfy a relation preferably represented by the following formula (1):

$$Lcp \times 0.1 < La \qquad (1), and$$

more preferably by the following formula:

$$Lcp \times 0.2 \leq La \leq Lcp \times 0.5 \qquad (2),$$

in which Lcp is the total length (a thickness of the porous plate 11) of each channel 13 in an extension axis G direction, and La is the length (a height of the electrode 1a in the channel 13) of the electrode 1a along the extension axis G direction of the channel 13.

In the MCP 1 having such a constitution, when a voltage is applied between the electrodes 1a and 1b, that is, opposite ends of each channel 13, an electric field having the extension axis G direction is generated in the channel 13. At this time, when electrons (the primary electrons) generated owing to a photoelectric effect in the electrode 1a enter the channel 13 from one end, an intense electric field formed in the channel 13 imparts energy to the incoming electrons, ionization/excitation collision between the electrons and gas atoms in the channel 13 is repeated in a multiple manner (avalanche manner), and the electrons and the light (excitation emission) rapidly in an exponential manner to perform electron/light multiplication.

FIG. 4 is a perspective view (a partially broken view) showing one preferable embodiment of an imaging device using a gas proportional counter (CGPC) of the present invention provided with the MCP 1. FIG. 5 is a sectional view schematically showing a main part of the imaging device.

In an imaging type X-ray detection device 200 (an imaging device), an imaging system 210 is connected to a power source system 34 and a control system 35 (which also serves as a measurement circuit system) in which a CAMAC unit and a display are incorporated. The imaging system 210 has a chamber 22 substantially having a cylindrical shape, having an upper end thereof covered with a beryllium window 21 (a window) and provided with an exhaust port 22a and a suction port 22b on a side wall thereof, and a chamber 23 bonded after the chamber 22 with respect to an incidence direction of an X-ray Pv (an electromagnetic wave).

In the chamber 22, hollow shaping rings 215, 216 and the MCP 1 are coaxially provided from an upstream side of the chamber along the incidence direction of the X-ray Pv. These shaping rings 215, 216 are connected to the power source system 34 and a ground potential, and the rings between a high voltage from the power source system 34 and the ground are resistance-divided to apply an appropriate drift voltage to each ring. These shaping rings 215, 216 define a drift area in a front space of the MCP 1.

Moreover, the electrodes 1a, 1b of the MCP 1 are connected to the power source system 34, respectively. A predetermined cathode voltage is applied to the electrode 1a, thereby allowing the electrode to function as an anode. A predetermined anode voltage is applied to the electrode 1b, thereby allowing the electrode to function as a cathode.

Furthermore, an opening is provided at a boundary between the chambers 22 and 23, and an FOP 2 is fitted into the opening so as to seal a chamber 22 side. In a space of the chamber 22 closed in this manner, an organic gas, for example, alkane halide such as $CF_4$ including preferably a halogen atom, more preferably a fluorine atom is added to an He gas, an Ar gas, an Xe gas, a $CH_4$ gas or the like as a main gas component. Furthermore, if necessary, a quenching gas is added. Such a gas 217 for detection is introduced. The gas 217 for detection is appropriately filled and evacuated using the exhaust port 22a and the suction port 22b.

An amount of an organic gas such as $CF_4$ to be added can appropriately be selected in accordance with a type of the gas, but the amount is set to preferably about 1 to 10 vol %, more preferably several vol % with respect to the total amount of the gas 217 for detection. Thus, the beryllium window 21, the chamber 22, the shaping rings 215, 216, the MCP 1 and the gas 217 for detection constitute a proportional counter of the present invention.

Furthermore, on a bottom wall of the chamber 23, a photo position detector 3 (a photo detector) is installed coaxially with the MCP 1 and the FOP 2, and a driving circuit board 4 for driving the photo position detector 3 is provided around the detector. As the photo position detector 3, a photo detector capable of detecting a two-dimensional position is preferable. Examples of the detector include a CMOS sensor array, an image intensifier (I.I.), a CCD, an ICCD, a PMT, and an imaging sensor using an anode board.

In addition, the power source system 34 is connected to the shaping rings 215, 216 and the MCP 1 via a power source terminal 24 provided on a side wall of the chamber 23, and the system supplies a driving power to the driving circuit board 4 and the photo position detector 3 via the power source terminal 24. Furthermore, the control system 35 is connected to the driving circuit board 4 via a signal terminal 25 provided on the side wall of the chamber 23.

In the imaging type X-ray detection device 200 using a gas proportional counter provided with the MCP 1 having such a constitution, the X-ray Pv which has entered the chamber 22 through the beryllium window 21 interacts with gas molecules of an area (the drift area) defined between the beryllium window 21 and the MCP 1, to produce and emit the primary electrons (X-ray photoelectrons) having high energy owing to the photoelectric effect. The primary electrons advance while imparting energy to the other gas molecules, and electron-ion pairs are generated in a track of the electrons to form electron cloud.

A forward bias voltage similar to that of a conventional high luminance mode is applied to the drift area, and the electron cloud generated by the primary electrons moves (drifts) toward the MCP 1 owing to an electric field (e.g., an intensity of about 100 V/cm) formed by the forward bias voltage. The electrons which have moved toward the MCP 1 in this manner enters the channels of the MCP in a conventional device, but in the MCP 1 of the present invention, entrance of the electrons into the channels 13 is disturbed.

Here, there will be described a result of electric field simulation performed by the present inventor by use of Maxwell & Garfield three-dimensional simulation codes in order to clarify behaviors of such electrons. Outlines of a structure model in the vicinity of the MCP 1 used in the simulation are as follows. It is to be noted that a shape of the channel 13 is basically equal to that shown in FIG. 3. The following symbols are shown in FIG. 3.

the total length Lcp of the channel 13: 500 μm
an inner diameter D of the channel 13: 50 μm
a distance $L_{top}$ between the electrode 1a and a front potential point $V_{top}$: 500 μm
a distance $L_{bot}$ between the electrode 1a and a rear potential point $V_{bot}$: 500 μm
the length La of the electrode 1a in the channel 13: 25, 50, 100 μm
a length Lb of the electrode 1b in the channel 13: 50 μm
a potential of an upper potential point: +45.8 V
a potential of the electrode 1a: +50 V
a potential of the electrode 1b: +1050 V
a potential of a lower potential point: +1045 V In this model, an electric field intensity of the drift area before the electrode 1a is 100 V/cm, and an electric field intensity in the channel 13 is $2 \times 10^4$ V/cm or more.

FIGS. 6 to 8 are diagrams showing calculation results of isoelectric (contours of the potential) distributions in the vicinity of an opening of the channel 13 in cases where the lengths La are 25, 50 and 100 μm, respectively. It has been confirmed that when the length La of the electrode increases, a portion where the contours are densely spaced changes to a deeper position in the channel 13.

Moreover, FIGS. 9 to 11 are diagrams showing calculation results of the electric field intensity in the channel 13 in cases where the lengths La are 25, 50 and 100 μm, respectively. It has been confirmed that when the length of the electrode 1a changes to 25, 50 and 100 μm, the electric field in the channel 13 increases to 23, 24.5 and 28 kV/cm at maximum. It has been found that when the length of the electrode 1a increases, the electric field in the channel 13 can be intensified. Conversely, when the length of the electrode 1a increases, the equal electric field intensity can be obtained with a low voltage.

Furthermore, FIGS. 12 to 14 are diagrams showing calculation results of a movement (drift) state of electrons in the channel 13 and in the vicinity of the channel in cases where the lengths La are 25, 50 and 100 μm on a condition that any gas is not present before the electrode 1a, respectively. It has been confirmed that when the length of the electrode 1a increases, electrons E present before the electrode 1a do not easily enter the channel 13.

In addition, FIGS. 15 to 17 are diagrams showing calculation results of the movement (drift) state of the electrons in the channel 13 and in the vicinity of the channel in cases where the lengths La are 25, 50 and 100 μm on the condition that a gas is present before the electrode 1a, respectively.

Moreover, 1000 virtual electrons were arranged at positions along the extension axis G of the channel 13 with a distance of 400 μm between the electrode 1a and the front potential point $V_{top}$, and behaviors of the electrons, and a ratio of the electrons which contributed to (participated in) electron multiplication owing to an interaction with a gas in the channel 13 were calculated and evaluated. Results are collectively shown in Table 1.

TABLE 1

| Length La of electrode 1a (μm) | Number of electrons (electrons) | | | Ratio (%) of electrons which contributed to electron multiplication in channel 13 |
| --- | --- | --- | --- | --- |
| | Drift area between $V_{top}$ and electrode 1a | Electrode 1a | Inner wall of channel 13 | |
| 25 | 18 | 155 | 827 | 16 |
| 50 | 23 | 463 | 513 | 14 |
| 100 | 32 | 946 | 22 | 1 |

From these results, it has been confirmed that when the length of the electrode 1a increases, the number of the electrons which stop in the electrode 1a increases. In consequence, the number of the electrons which reach the inside of the channel 13 decreases, and further the ratio of the electrons which contribute to electron multiplication in the channel 13 decreases. Especially, it is understood that when the length La of the electrode 1a is larger than 50 μm (i.e., La=Lcp×0.1), a ratio at which the electrons E generated in the drift area before the electrode 1a contribute to the electron multiplication in the channel 13 remarkably decreases. When La is 100 μm (i.e., La=Lcp×0.2) or more, the contribution ratio can be reduced to a substantially negligible ratio.

One of reasons why the electrons E present in the drift area before the electrode 1a do not easily enter the channel 13 is supposedly that as shown in FIGS. 6 to 8, when the length La of the electrode increases, the portion where the contours are densely spaced changes to a deeper position in the channel 13, whereby the electrons entering an opening end of the channel 13 move so as to enter the electrode 1a (see FIGS. 12 to 14). However, a function is not limited to this function.

The electron cloud generated in the drift area in this manner does not easily enter the channel 13, and a part of the X-ray Pv which has entered the chamber 22 reaches the MCP 1 without being converted into the electrons owing to the interaction with the gas molecules. When this X-ray Pv enters the electrode 1a, photoelectric conversion is caused by the interaction with the electrode 1a to generate photoelectrons. At this time, the electrode 1a includes an alkali metal atom having a reaction sectional area of the photoelectric conversion, so that generation efficiency of the photoelectrons is increased.

The photoelectrons generated from the electrode 1a are generated in the vicinity of the opening of the channel 13 or in the channel 13, and hence immediately enter the channel 13. In the channel 13, an electric field of, for example, $10^4$ V/cm or more is formed so that electric discharge of the gas and excitation emission are sufficiently caused, and the electrons successively collide with the gas molecules to perform the electron multiplication and light multiplication.

In this case, when various reactions are caused and, above all, excited $CF_4$ molecules transit to a base bottom state, light having a wavelength peculiar to the energy transition is emitted ($CF_4^* \rightarrow CF_4 + h\nu$). A wavelength region of this excitation emission is broad from visible light to an infrared region (about 400 to 900 mm), and a peak wavelength of the region is about 620 nm. This emission wavelength tends to most match sensitivity of a CCD among specific devices of the photo position detector 3.

The light which has multiplied in this manner passes through the FOP 2 to enter the photo position detector 3 without being photoelectrically converted again. The photo position detector 3 outputs information on the two-dimensional position which the light enters and an electric signal based on light intensity at each incidence position to the control system 35 through the driving circuit board 4, and a three-dimensional X-ray emission image is constituted in the system and output to the display or the like.

Here, FIGS. 20 to 22 are photographs showing results of imaging. The inner diameter D of the channel 13 was set to 100 μm, the MCP 1 was prepared using Inconel 600 as the electrodes 1a, 1b, and a test pattern (an aperture) shown in FIG. 19 was disposed before the beryllium window 21 and imaged while irradiated with the X-ray in a high resolution mode to apply a reverse bias voltage. It is to be noted that in the chamber 23, an Ar+CF$_4$ mixture gas having a predetermined pressure was introduced. FIGS. 20 to 22 show results in cases where pressures of the mixture gas are 1 atm, 0.5 atm and 0.25 atm, respectively. It is also indicated that when numeric values shown in FIGS. 20 to 22 increase, straight lines reflected adjacent to the values are dense.

It has been confirmed from these results that the MCP 1 of the present invention and the imaging type X-ray detection device 200 using the gas proportional counter provided with the MCP have sufficient imaging sensitivity even in the high resolution mode remarkably excellent in positional resolution. During an operation in a high luminance mode to apply a forward bias, when a gas pressure in the chamber decreases, track lengths of the electrons usually increase. Therefore, when the gas pressure decreases, the resolution tends to deteriorate. On the other hand, as apparent from FIGS. 20 to 22, it has been found that in the MCP 1 of the present invention and the imaging type X-ray detection device 200 using the gas proportional counter provided with the MCP, even when such a gas pressure in the chamber changes, the deterioration of the resolution is not recognized.

According to the imaging type X-ray detection device 200 using the gas proportional counter provided with the MCP 1 having such a constitution, the electrons highly efficiently generated owing to the interaction between the alkali metal atom included in the electrode 1a and the X-ray Pv function as an electron source for the electron/light multiplication in the channel 13, so that the imaging with the high luminance (high sensitivity) can be performed. The electron cloud generated in the drift area moves toward the MCP 1 while being diffused in the gas, but the cloud is inhibited from entering the MCP 1. Moreover, the photoelectrons generated in the vicinity of the opening of the channel 13 and in the channel are hardly diffused in the gas, and hence information on the position which the X-ray Pv has entered can more exactly be retained. Then, these photoelectrons function as the electron source for the electron/light multiplication in the channel 13, so that the excellent positional resolution determined by the inner diameter of the channel 13 can be realized. Thus, the X-ray imaging with the high luminance and the high resolution is realized.

It is to be noted that the present invention is not limited to the above-mentioned embodiments, and can variously be modified within the scope of the present invention. For example, a shape of the MCP 1 is not limited to a disc shape, and a square plate-like shape or the like may be used. FIG. 18 is a perspective view schematically showing another example of the MCP according to the present invention. An MCP 10 includes a rectangular outer peripheral frame 212, and a base body 211 provided with a large number of channels 13 and constituted of an insulating member such as glass or a resin is provided on an inner side of the frame. Furthermore, the MCPs 1, 10 do not have to have the outer peripheral frames 12, 212.

Furthermore, a gas of TMA, TEA or the like which produces a penning effect may be added to the gas 217 for detection instead of or in addition to the CF$_4$ gas, but from a viewpoint that the excited light wavelength is in a visible region as described above, an organic gas, for example, alkane halide such as CF$_4$ is more preferable. Furthermore, instead of the FOP 2, a combination of a conventional light transmission window and an optical system may be used, or a bundle-like optical fiber may be used. In addition, the electrode 1b does not have to include any alkali metal atom.

Moreover, in the above embodiment, the detection and imaging of the X-ray have been described, but a detection target is not limited to the X-ray. The MCP, the gas proportional counter and the imaging device according to the present invention may be used in detection of another electromagnetic wave and ionization radiation. Especially, the photoelectric converter portions include the alkali metal atoms, and hence have high sensitivity even with respect to light having a wavelength from an ultraviolet region to a near-infrared region. Even in this case, the above-mentioned example positional resolution can be realized.

Furthermore, the electrode 1a may be provided with a layer including nuclear species (e.g., $^{10}$B) having a large neutron radiation absorbing sectional area (a sectional area of reaction with respect to neutrons). In this case, the present invention also functions as a detection device of the neutrons. That is, in this case, a nuclear reaction represented by the following formula (3) occurs:

$$^{10}B+n \rightarrow {}^{4}He+{}^{7}Li+2.78 \text{ MeV} \quad (3).$$

At this time, discharged $^4$He (α-line) and $^7$Li impart energy to the gas in the channel 13 to generate primary electron cloud, and this primary electron cloud can be a source for the electron/light multiplication in the channel 13. In consequence, during the detection of the neutrons, a positional resolution of the order of μm can be achieved. A positional resolution of a usual neutron detector using the gas is of the order of cm. Therefore, according to the MCP, the gas proportional counter and the imaging device of the present invention, the positional resolution in the detection of the neutrons can be improved as much as about 1000 times a conventional resolution.

Furthermore, there is not any special restriction on a material of the porous plate 11. However, when glass is used, the reaction between the alkali metal atom included in the electrode 1a and oxygen can be inhibited. This is preferable from a viewpoint of preventing the deterioration of the electrode 1a with elapse of time.

INDUSTRIAL APPLICABILITY

As described above, according to a microchannel plate, a gas proportional counter and an imaging device of the present invention, both high luminance and high resolution can be attained at the same time. Therefore, the present invention is broadly usable in any measurement of an electromagnetic wave or ionization radiation, including positional detection.

BRIEF DESCRIPTION OF THE DRAWINGS

FIG. 12 is a diagram showing a calculation result of a movement state of electrons in the channel 13 and in the vicinity of the channel in a case where the length La of the electrode 1a is 25 μm on a condition that any gas is not present before the electrode 1a;

FIG. 13 is a diagram showing a calculation result of the movement state of the electrons in the channel 13 and in the vicinity of the channel in a case where the length La of the electrode 1a is 50 μm on the condition that any gas is not present before the electrode 1a;

FIG. 14 is a diagram showing a calculation result of the movement state of the electrons in the channel 13 and in the vicinity of the channel in a case where the length La of the electrode 1a is 100 μm on the condition that any gas is not present before the electrode 1a;

FIG. 15 is a diagram showing a calculation result of the movement state of the electrons in the channel 13 and in the vicinity of the channel in a case where the length La of the electrode 1a is 25 μm on the condition that a gas is present before the electrode 1a;

FIG. 16 is a diagram showing a calculation result of the movement state of the electrons in the channel 13 and in the vicinity of the channel in a case where the length La of the electrode 1a is 50 μm on the condition that the gas is present before the electrode 1a;

FIG. 17 is a diagram showing a calculation result of the movement state of the electrons in the channel 13 and in the vicinity of the channel in a case where the length La of the electrode 1a is 100 μm on the condition that the gas is present before the electrode 1a;

Figure 1:
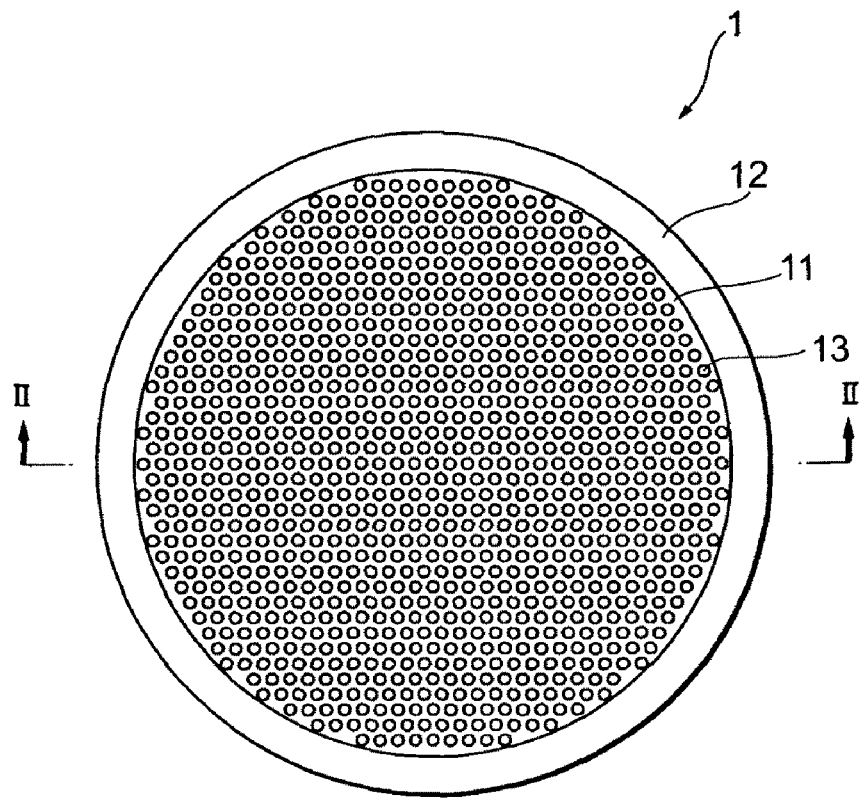
FIG. 1 is a plan view schematically showing one preferable embodiment of an MCP according to the present invention.
Figure 2:
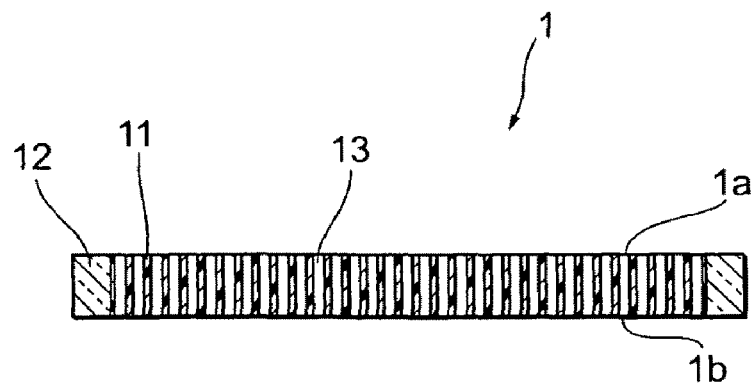
FIG. 2 is a sectional view cut along the II-II line of FIG. 1.
Figure 3:
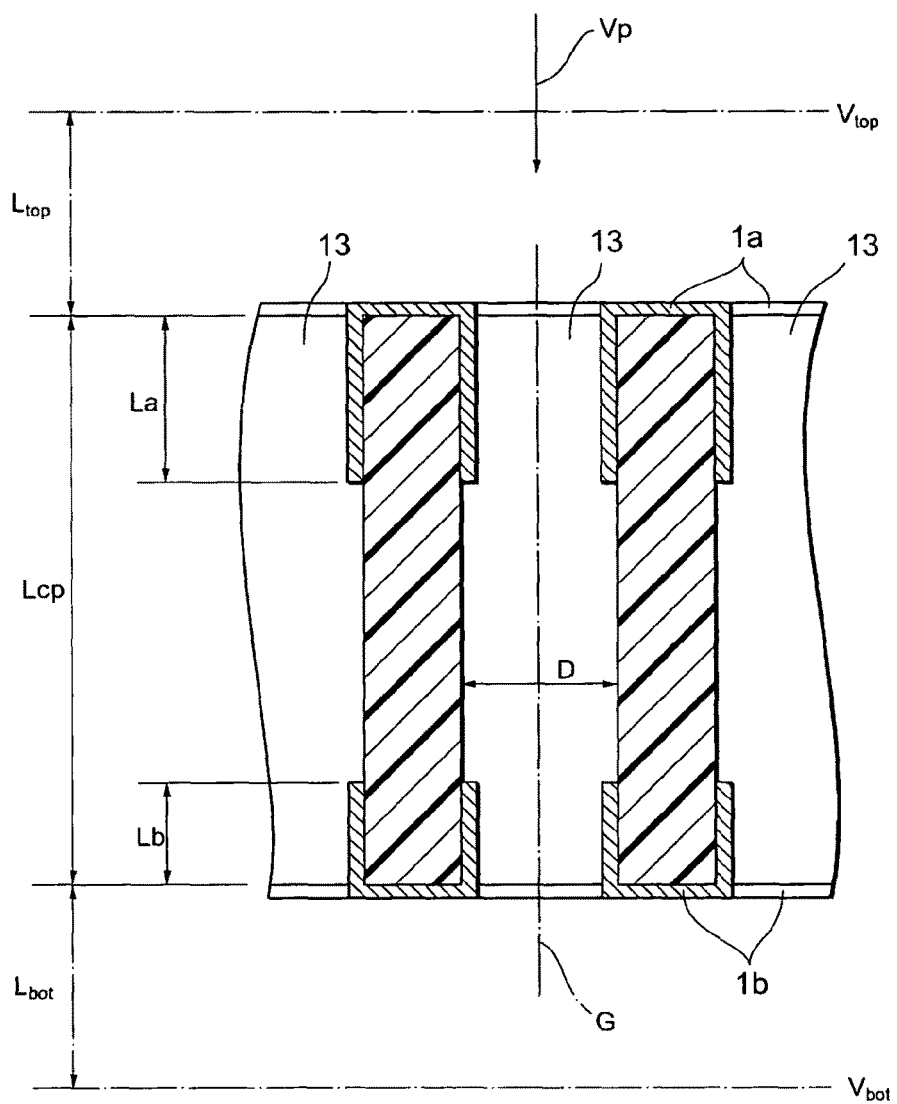
FIG. 3 is a main part enlarged view of FIG. 2, and a sectional view schematically showing channels 13 and peripheries of the channels.
Figure 4:
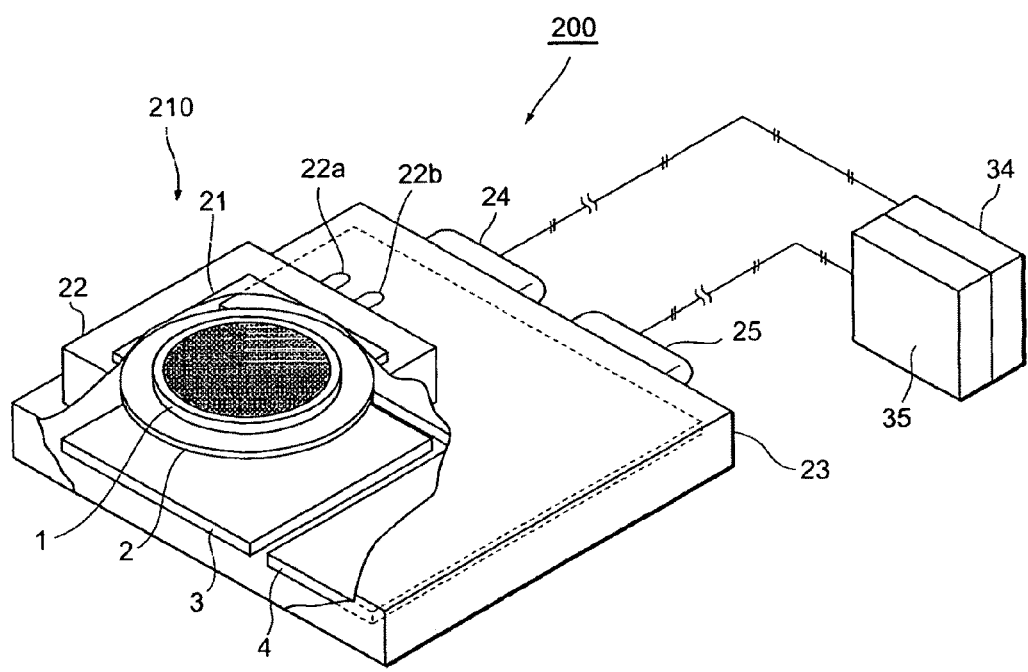
FIG. 4 is a perspective view showing one preferable embodiment of an imaging device using a gas proportional counter of the present invention provided with an MCP 1.
Figure 5:
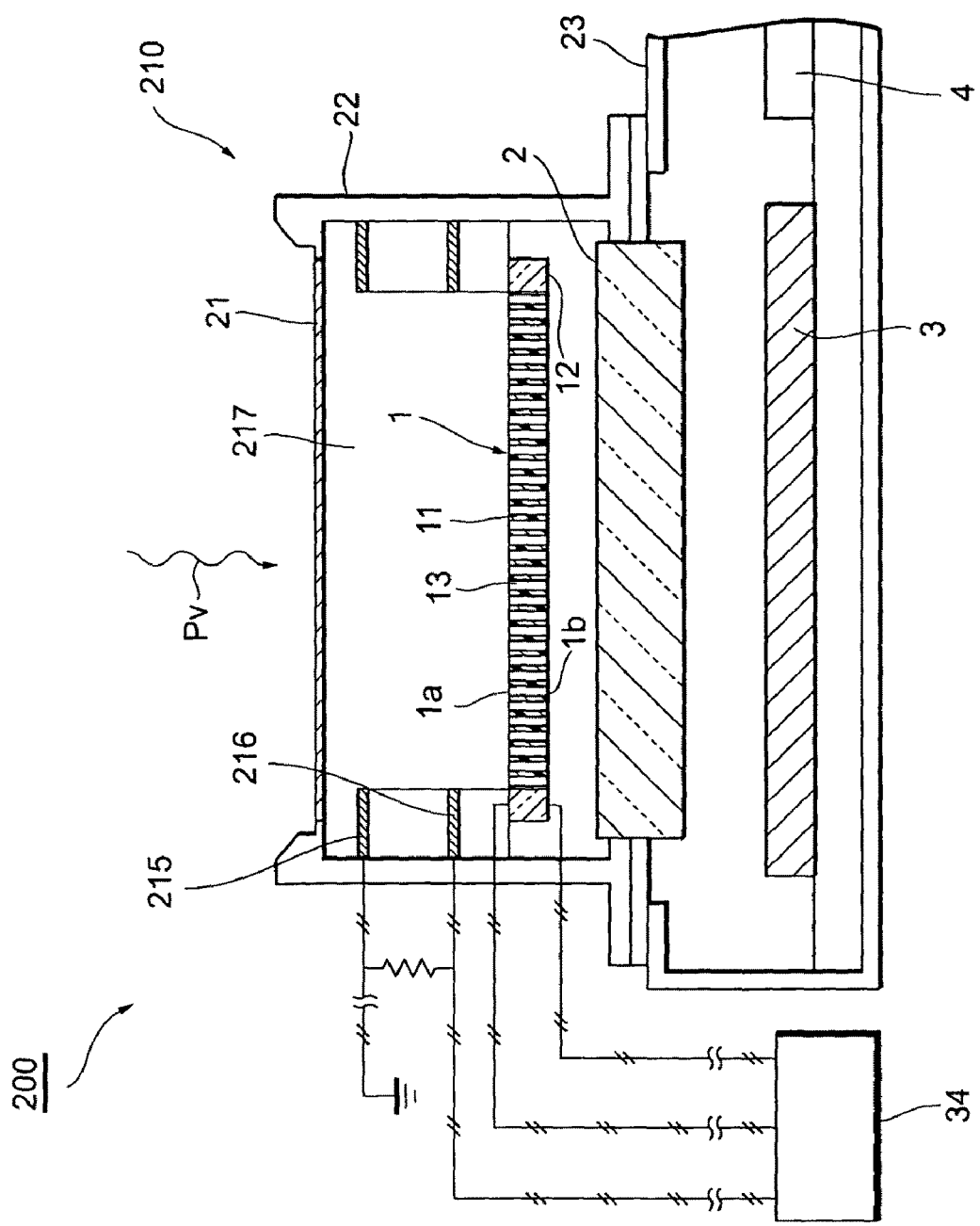
FIG. 5 is a sectional view schematically showing a main part of the imaging device shown in FIG. 4.
Figure 6:
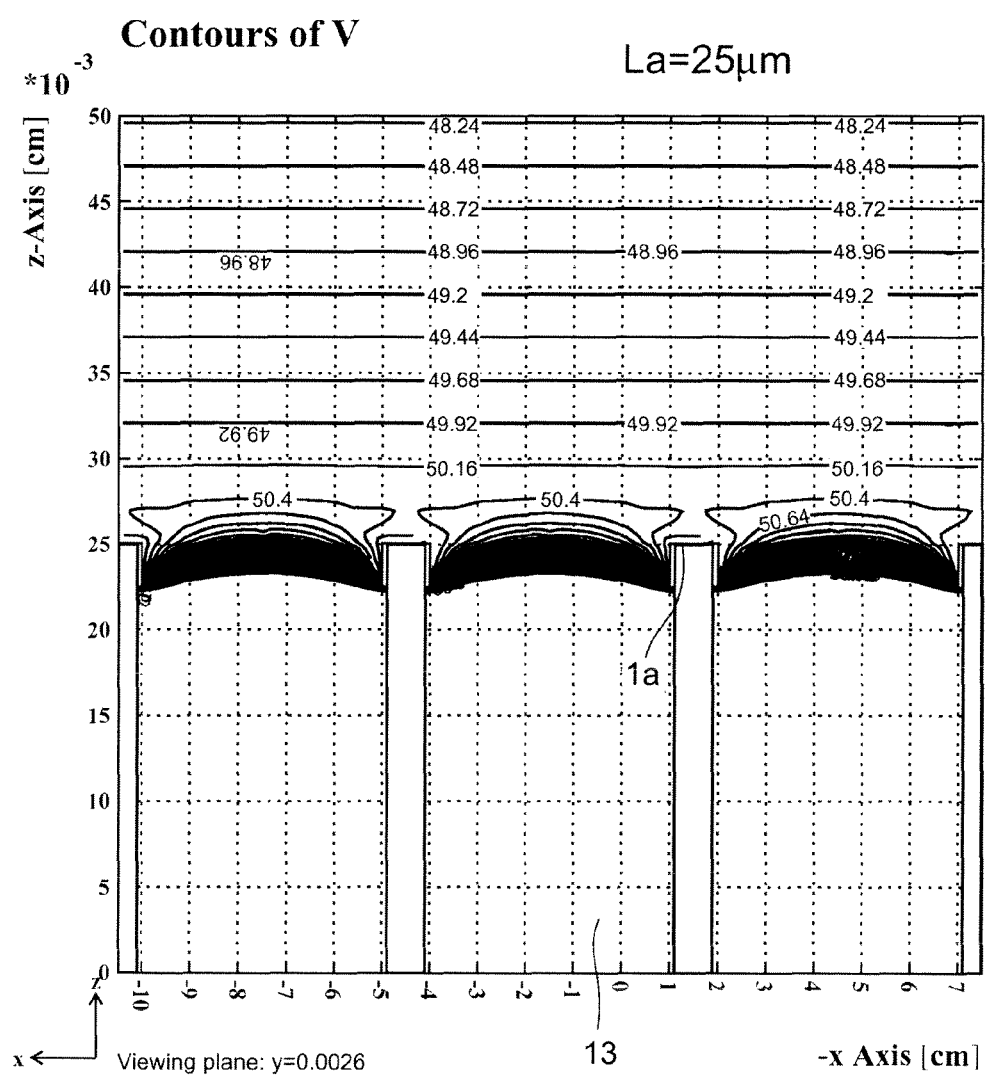
FIG. 6 is a diagram showing a calculation result of an isoelectric distribution in the vicinity of an opening of a channel 13 in a case where a length La of an electrode 1a is 25 μm.
Figure 7:
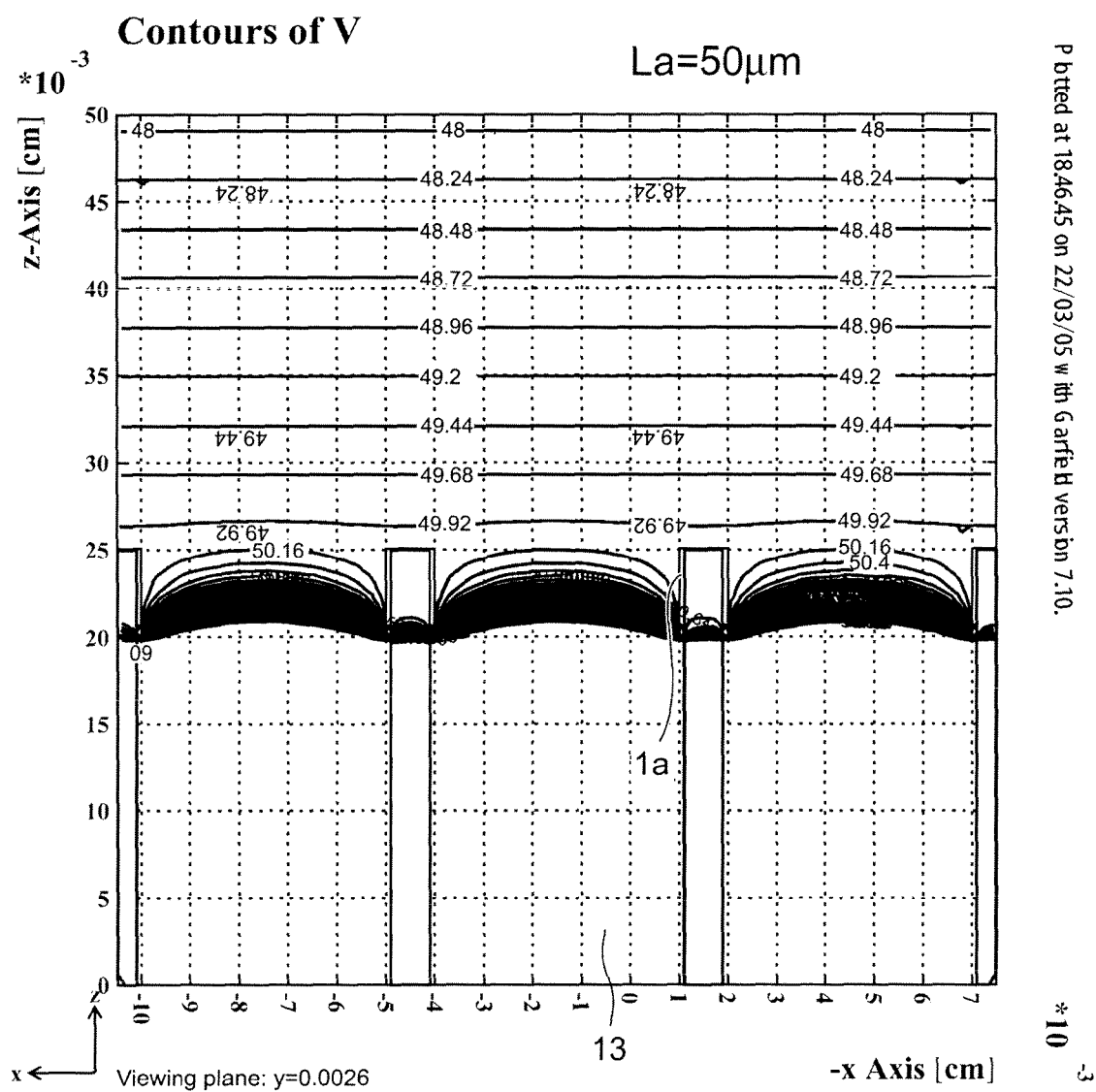
FIG. 7 is a diagram showing a calculation result of the isoelectric distribution in the vicinity of the opening of the channel 13 in a case where the length La of the electrode 1a is 50 μm.
Figure 8:
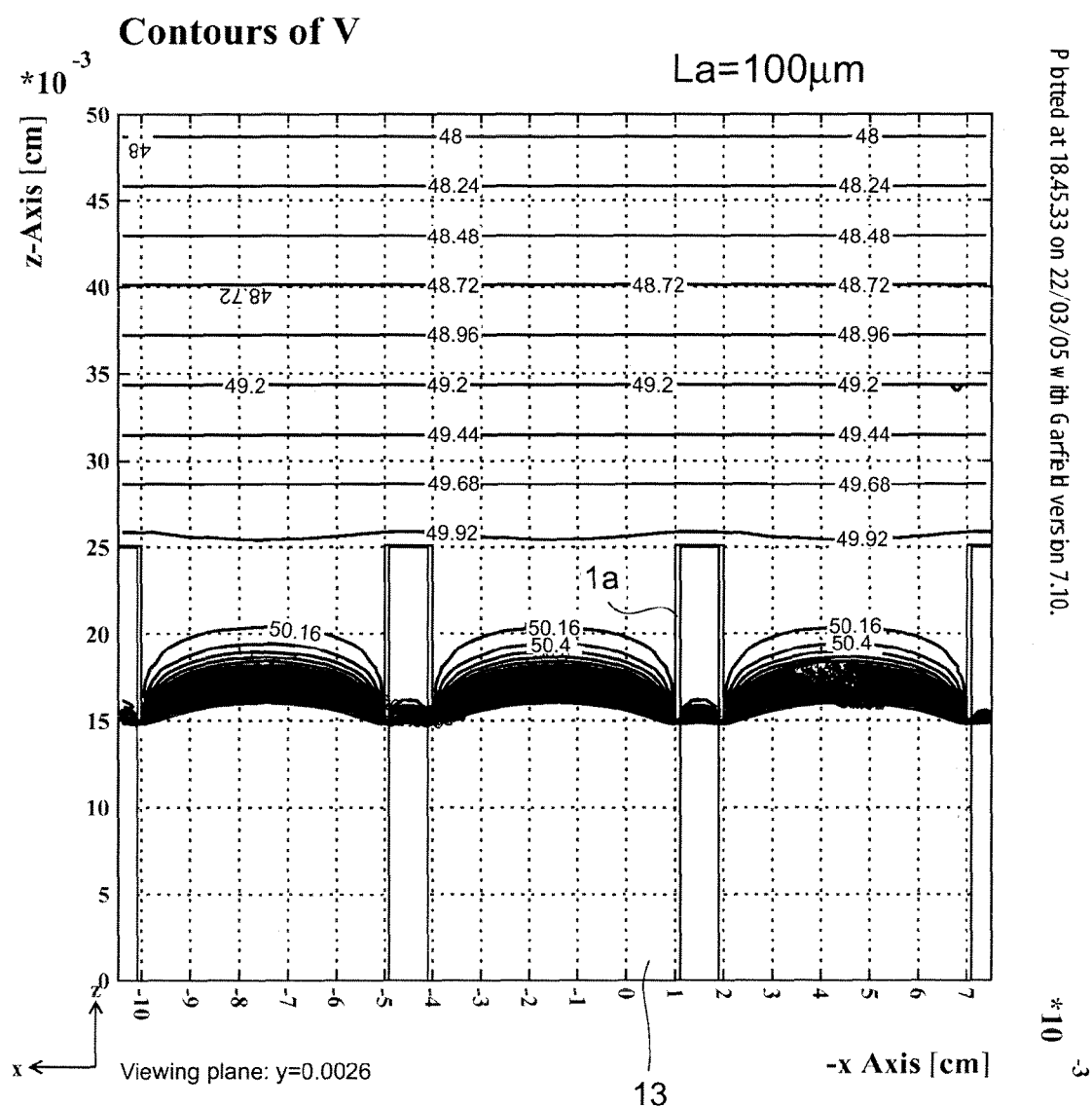
FIG. 8 is a diagram showing a calculation result of the isoelectric distribution in the vicinity of the opening of the channel 13 in a case where the length La of the electrode 1a is 100 μm.
Figure 9:
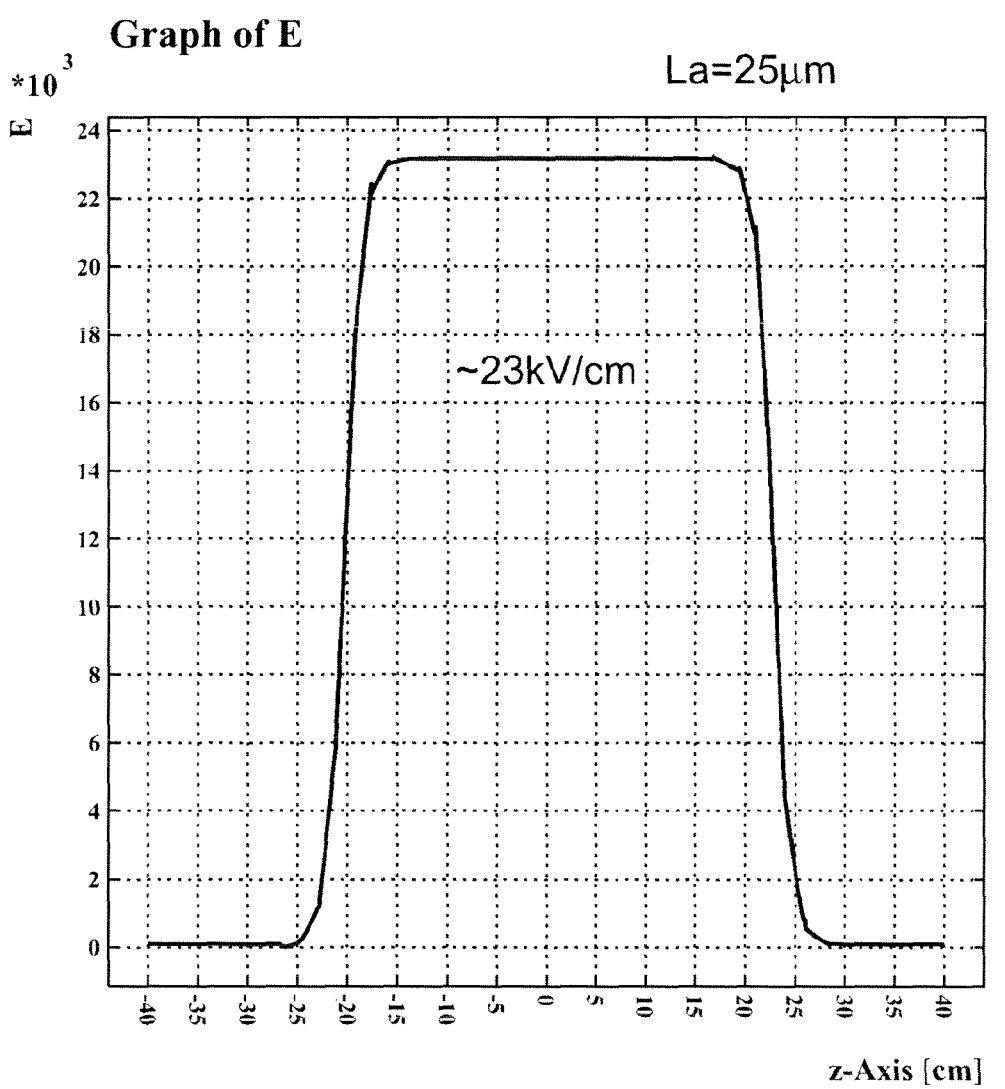
FIG. 9 is a diagram showing a calculation result of an electric field intensity in the channel 13 in a case where the length La of the electrode 1a is 25 μm.
Figure 10:
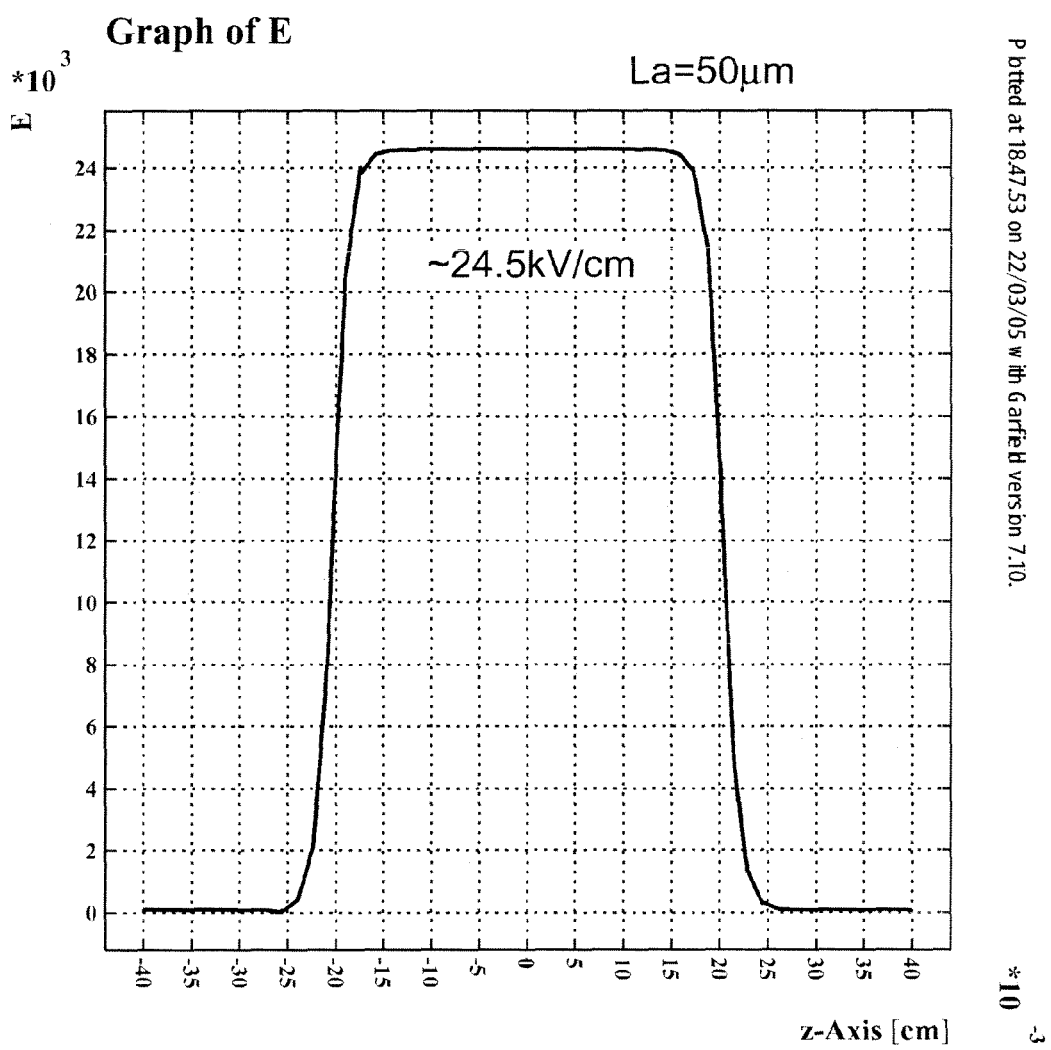
FIG. 10 is a diagram showing a calculation result of the electric field intensity in the channel 13 in a case where the length La of the electrode 1a is 50 μm.
Figure 11:
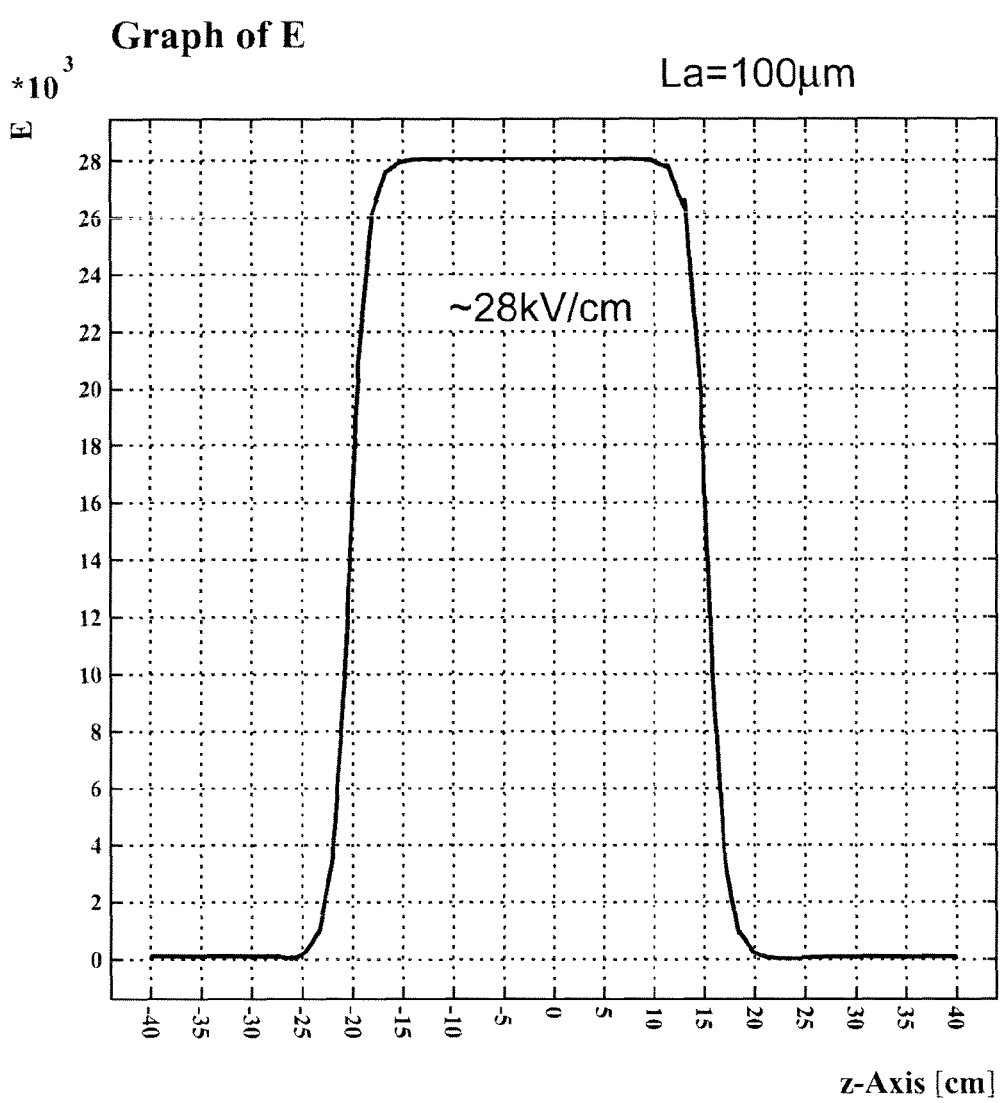
FIG. 11 is a diagram showing a calculation result of the electric field intensity in the channel 13 in a case where the length La of the electrode 1a is 100 μm.
Figure 12:
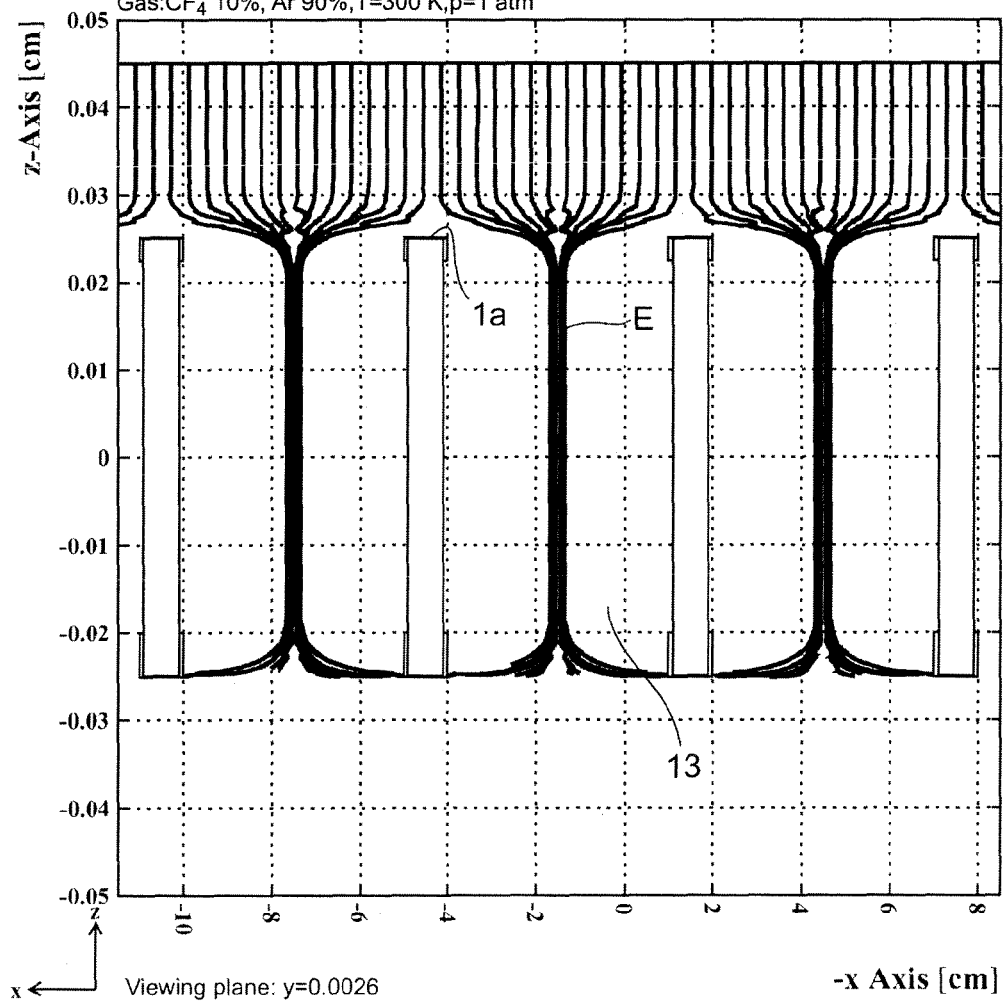
Figure 13:
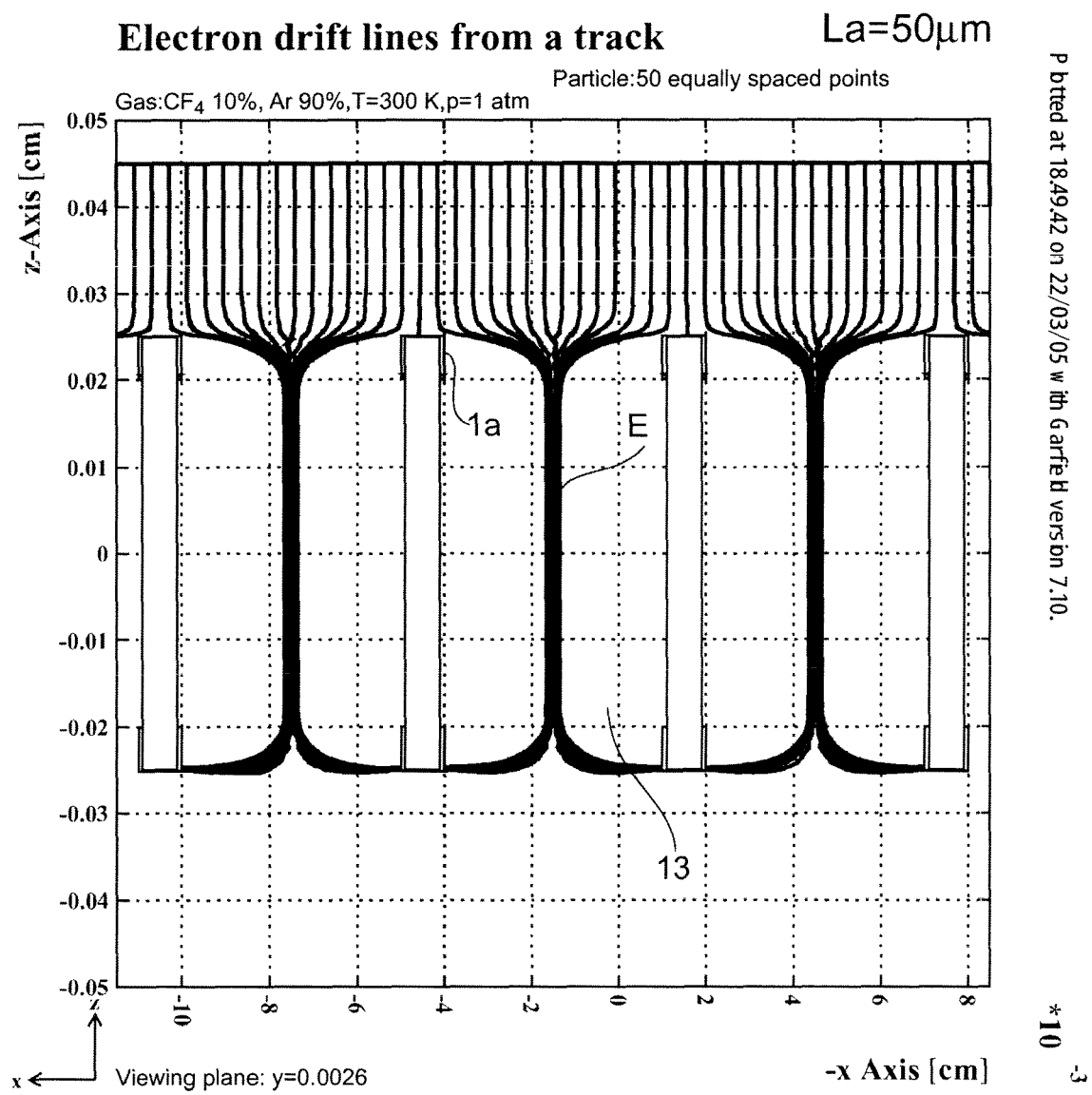
Figure 14:
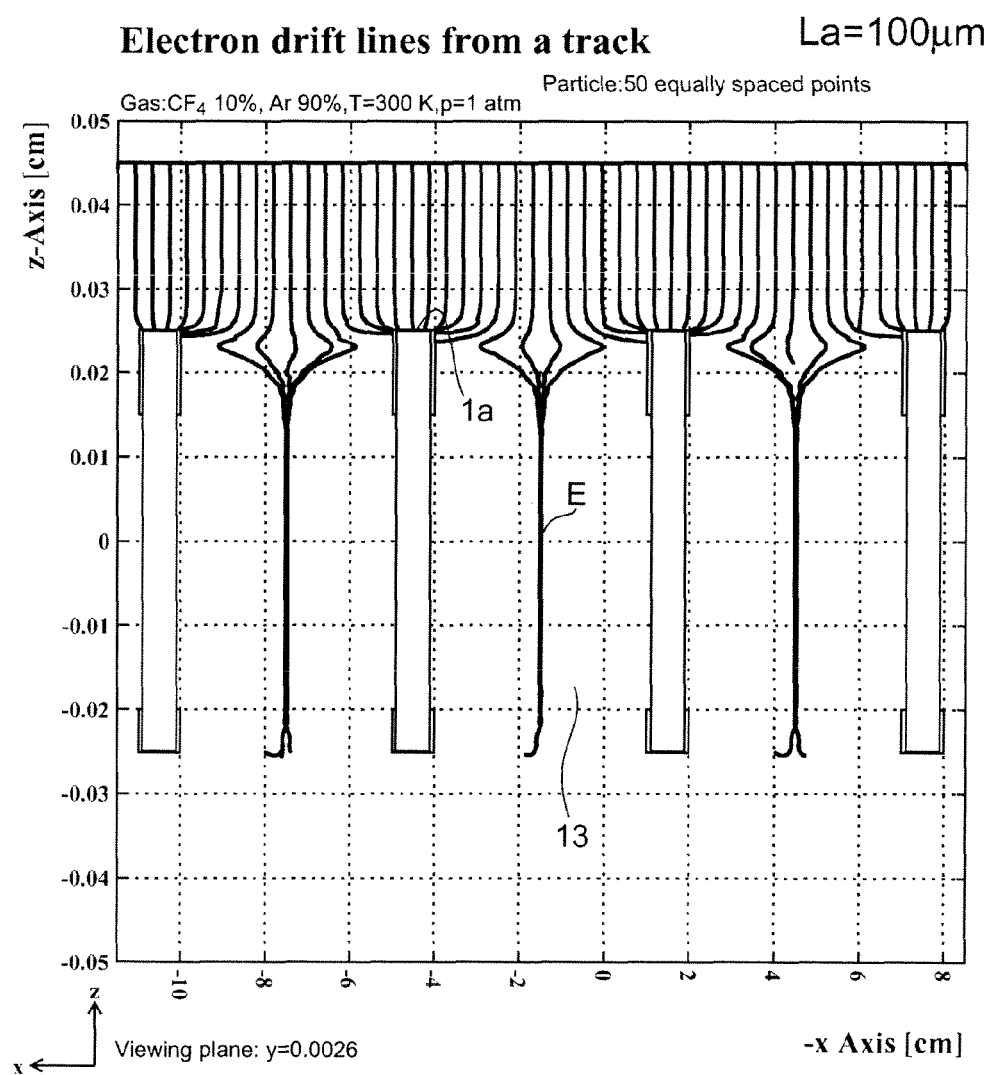
Figure 15:
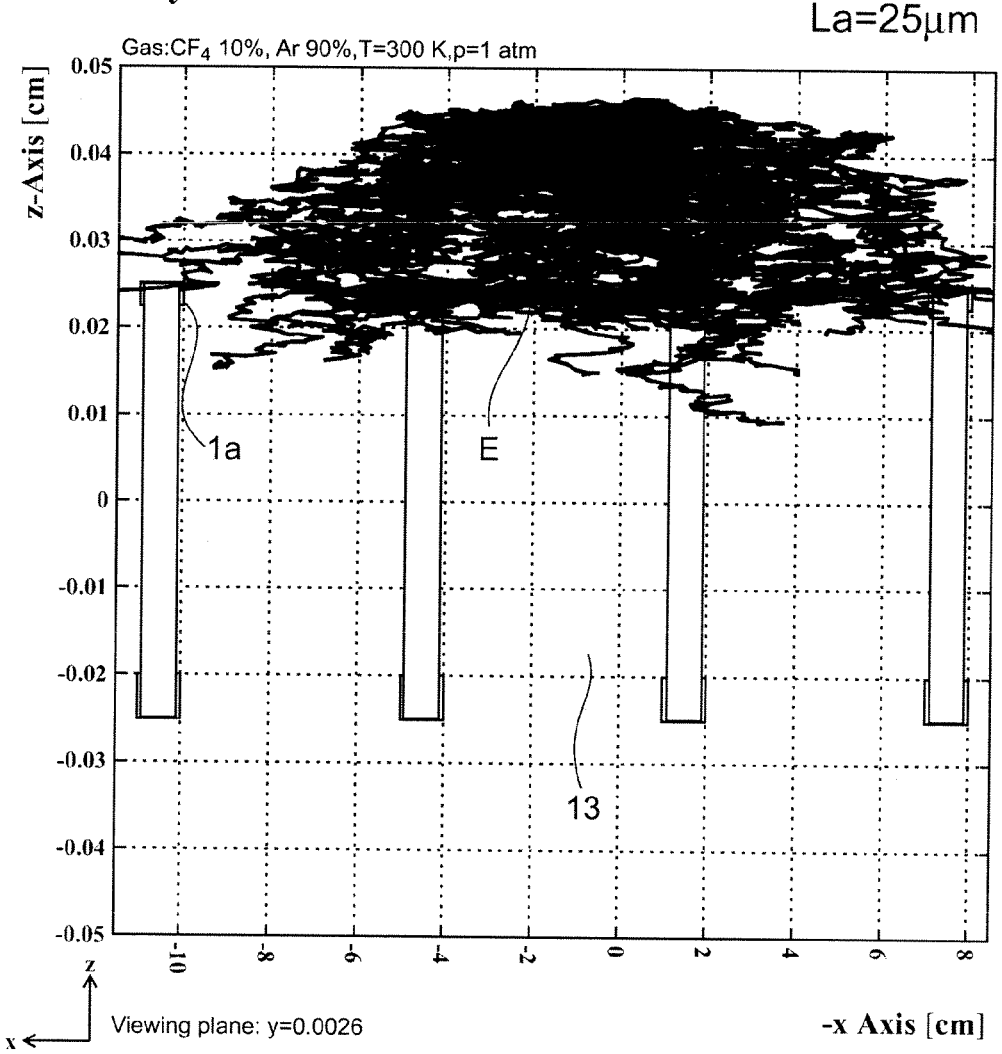
Figure 16:
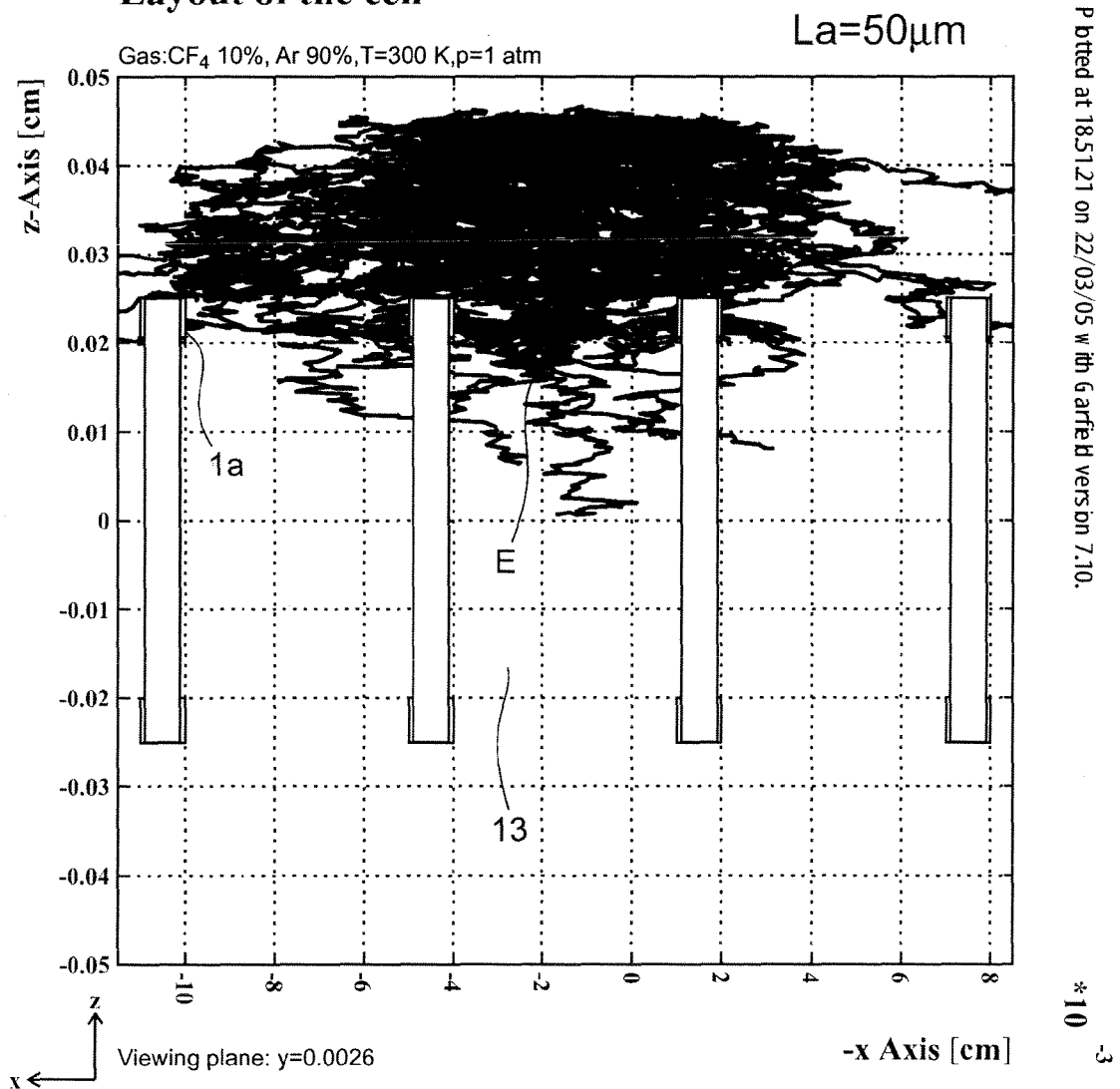
Figure 17:
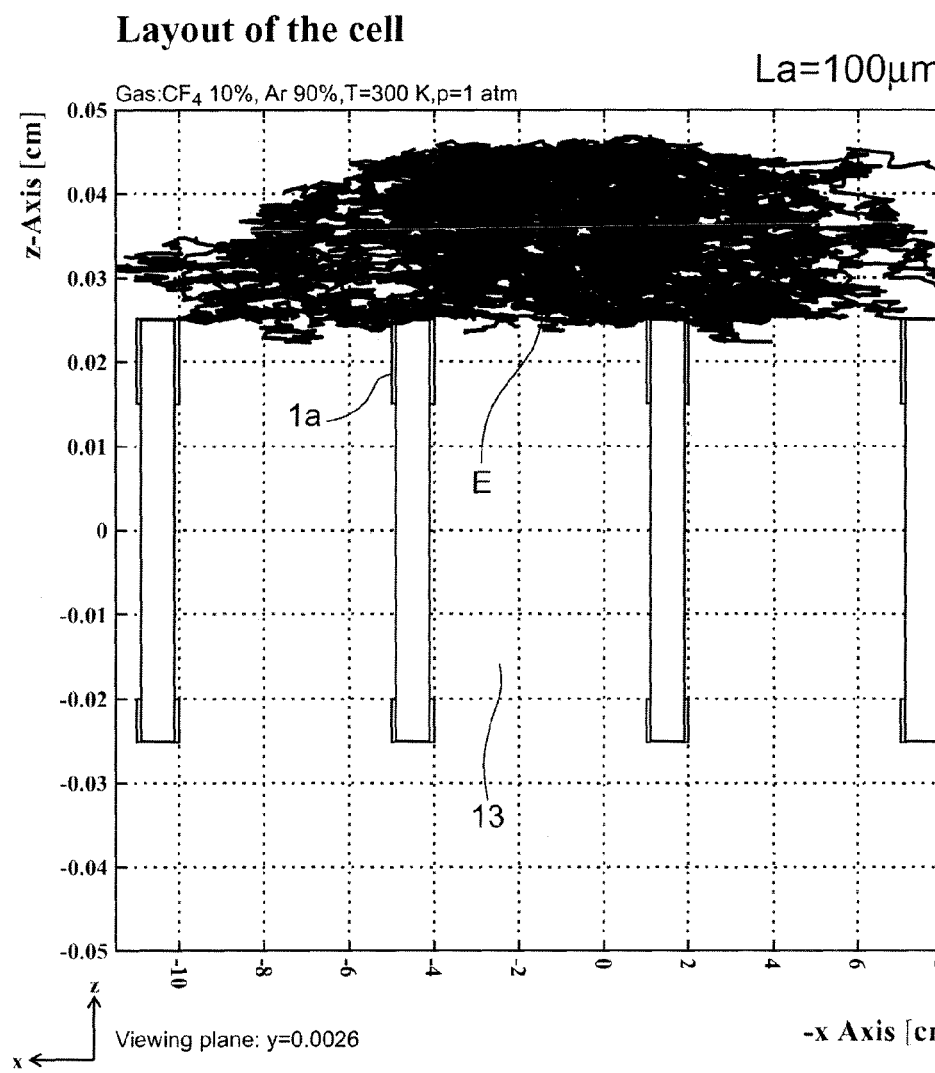
Figure 18:
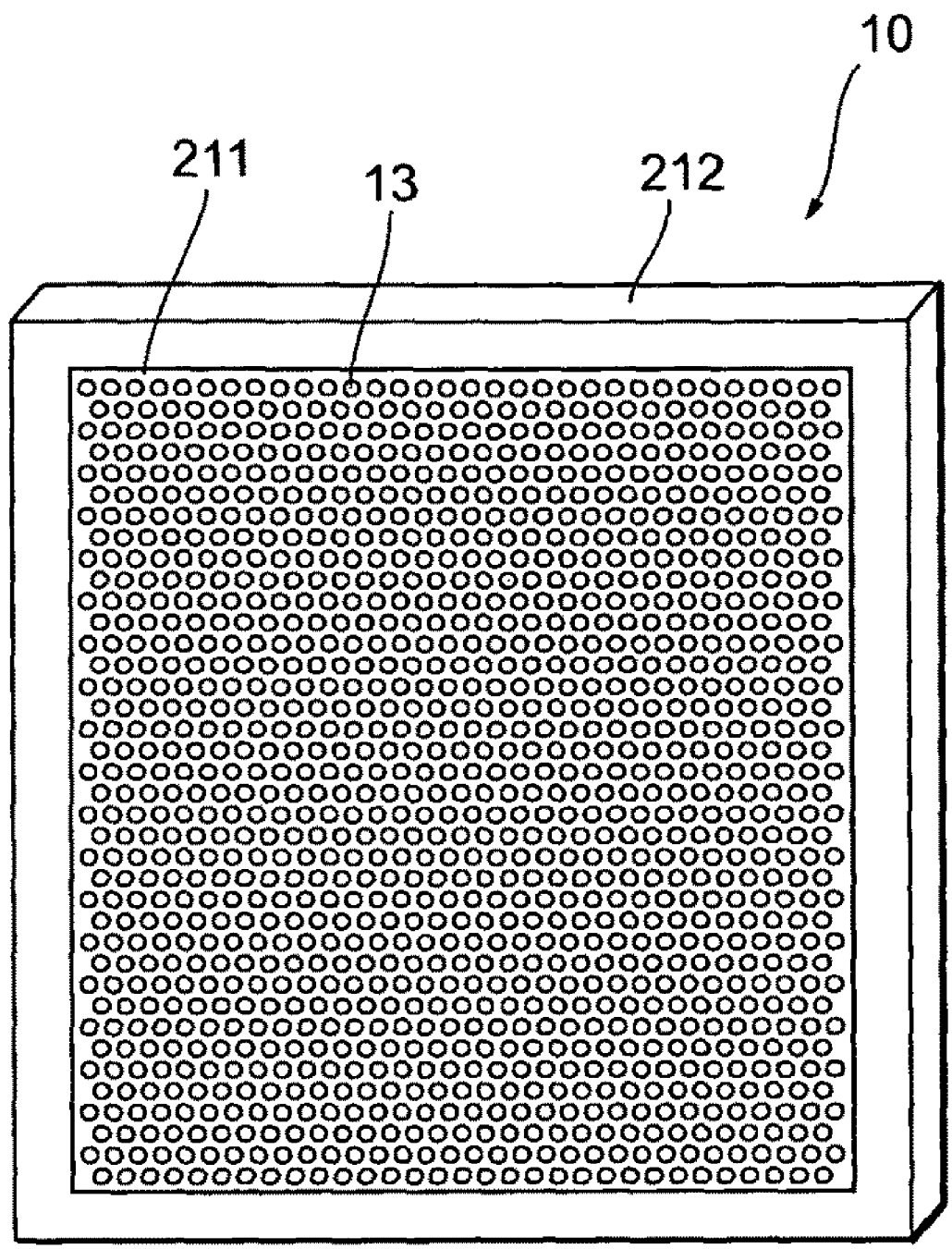
FIG. 18 is a perspective view schematically showing another example of the MCP according to the present invention.
Figure 19:
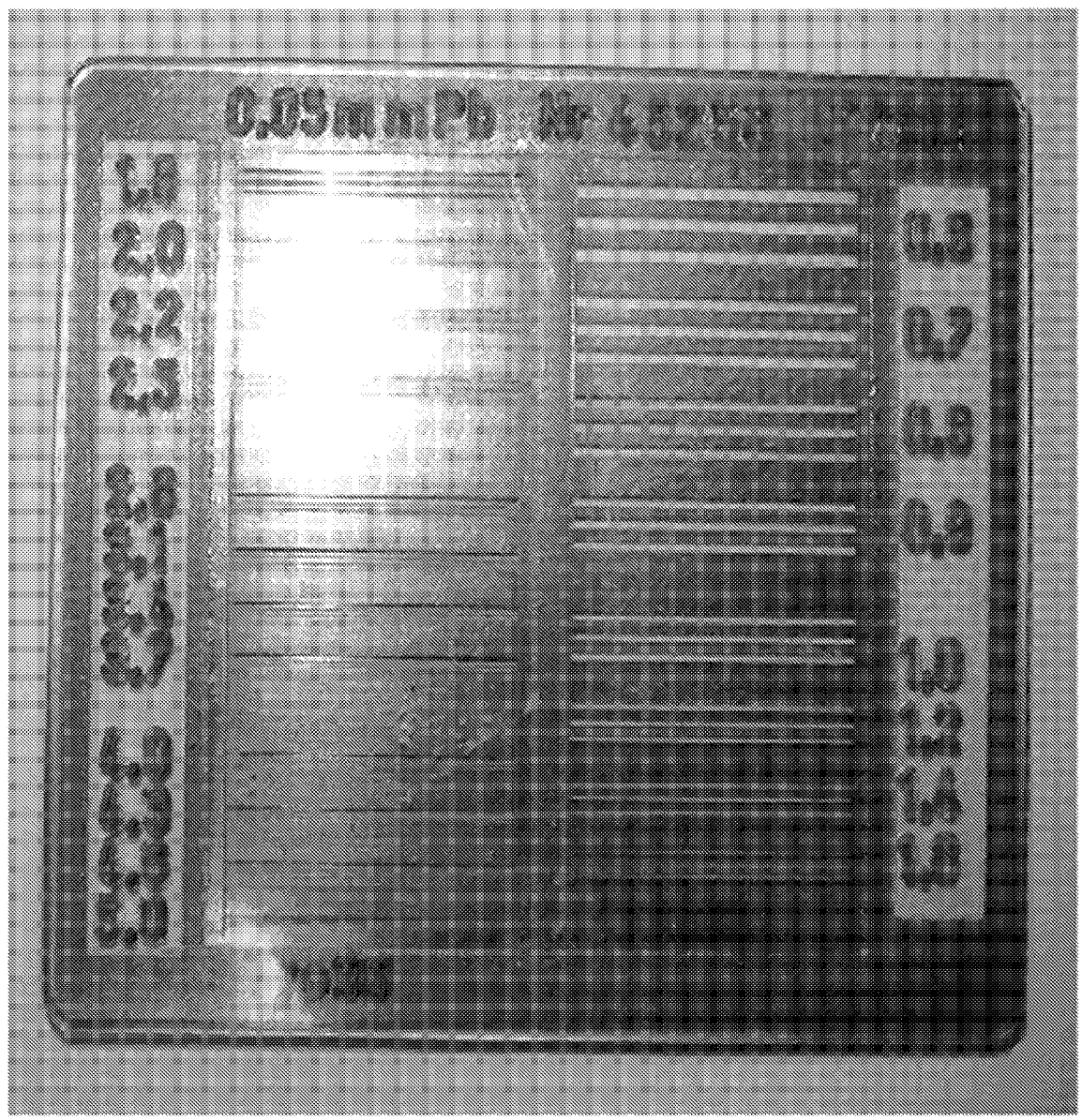
FIG. 19 is a plane photograph showing a test pattern.
Figure 20:
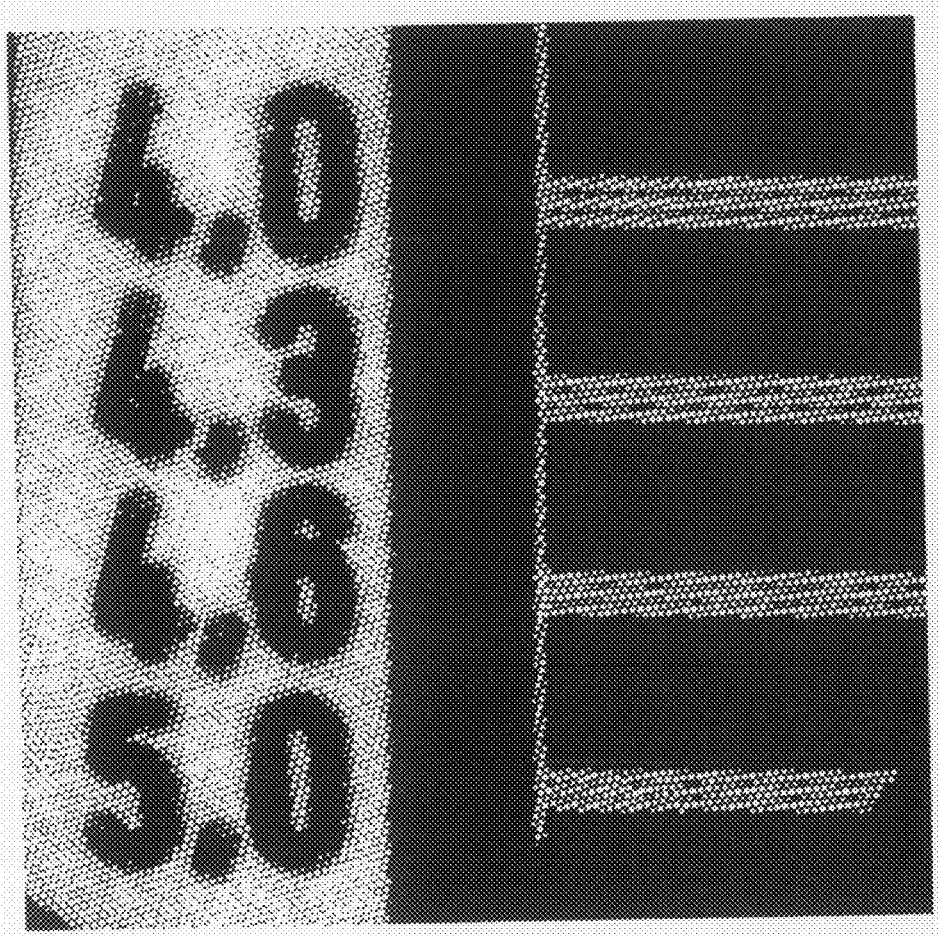
FIG. 20 is a photograph showing a result obtained by operating the MCP 1 in a high resolution mode and imaging the test pattern with an X-ray.
Figure 21:
FIG. 21 is a photograph showing a result obtained by operating the MCP 1 in the high resolution mode and imaging the test pattern with the X-ray.
Figure 22:
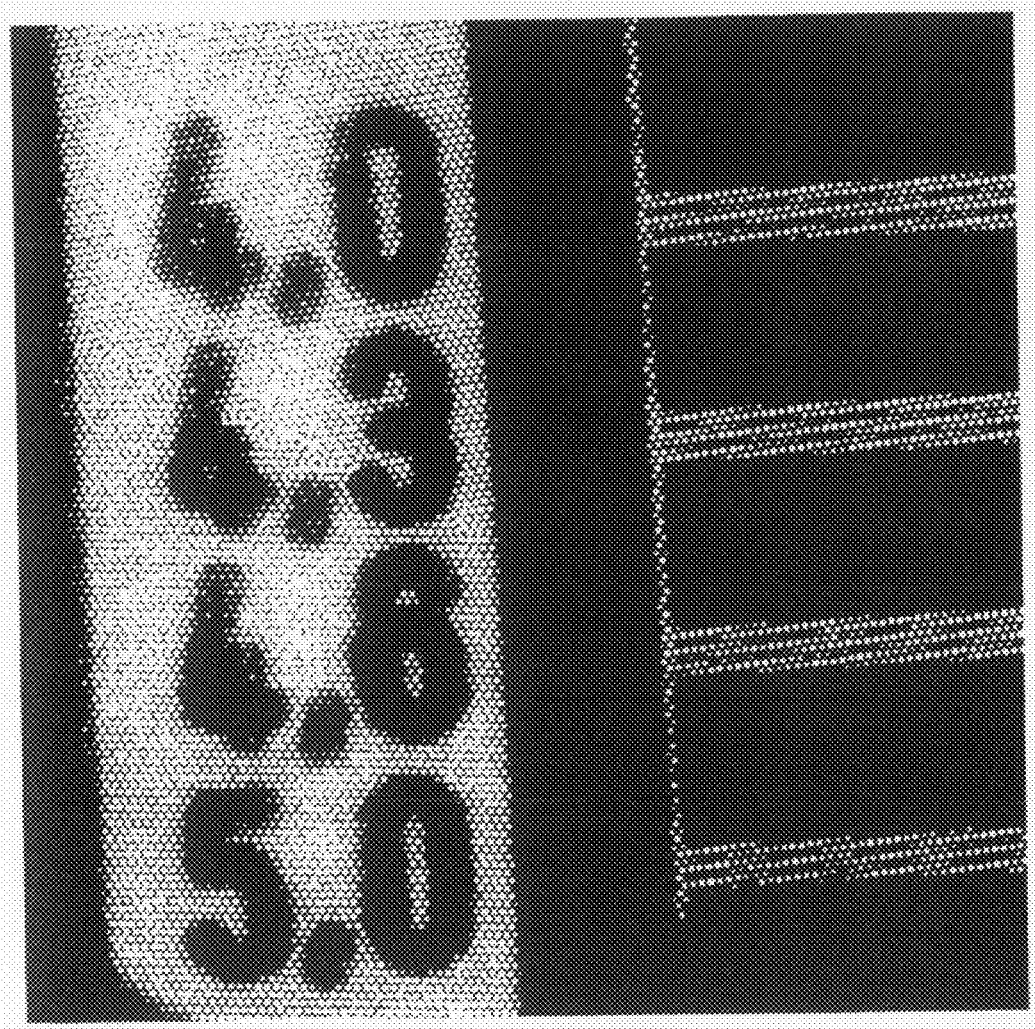
FIG. 22 is a photograph showing a result obtained by operating the MCP 1 in the high resolution mode and imaging the test pattern with the X-ray.

The invention claimed is:

1. A microchannel plate which comprises a base body provided with a plurality of through holes and having an insulating property,
wherein the base body has a first photoelectric converter portion formed on at least inner walls of the plurality of through holes on one end side, and a second photoelectric converter portion formed on the inner walls of the plurality of through holes on the other end side and arranged apart from the first photoelectric converter portion, and
the first and second photoelectric converter portions are configured to also serve as electrodes to apply a predetermined voltage to opposite ends of the through holes.

2. The microchannel plate according to claim 1,
wherein the first and second photoelectric converter portions include alkali metal atoms.

3. The microchannel plate according to claim 2,
wherein the first and second photoelectric converter portions satisfy a relation represented by the following formula (I):

$$Lcp \times 0.1 < La \quad (1),$$

in which Lcp: a length of each through hole in an axial direction, and
La: a length of the first and second photoelectric converter portions along the axial direction of the through hole.

4. The microchannel plate according to claim 1,
wherein the first and second photoelectric converter portions include a plurality of types of alkali metal atoms.

5. The microchannel plate according to claim 1,
wherein sections of the inner walls of the plurality of through holes have a substantially linear shape which is vertical to a plane direction of the base body.

6. A gas proportional counter which comprises:
a chamber filled with a gas for radiation detection mainly including an inert gas and having a window which an electromagnetic wave or ionization radiation enters, and
the MCP arranged in the chamber according to claim 1.

7. The gas proportional counter according to claim 6,
wherein the gas for radiation detection contains an organic gas including a halogen atom in molecules.

8. An imaging device which comprises:
the gas proportional counter according to claim 6, and
a photo-detector arranged after the chamber.

* * * * *